(12) United States Patent
Wigren

(10) Patent No.: US 12,411,221 B2
(45) Date of Patent: Sep. 9, 2025

(54) USER EQUIPMENT TWO-DIMENSIONAL STATE ESTIMATION

(71) Applicant: Telefonaktiebolaget LM Ericsson (publ), Stockholm (SE)

(72) Inventor: Torbjörn Wigren, Uppsala (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 377 days.

(21) Appl. No.: 17/919,665

(22) PCT Filed: Apr. 21, 2020

(86) PCT No.: PCT/SE2020/050402
§ 371 (c)(1),
(2) Date: Oct. 18, 2022

(87) PCT Pub. No.: WO2021/215974
PCT Pub. Date: Oct. 28, 2021

(65) Prior Publication Data
US 2023/0358873 A1   Nov. 9, 2023

(51) Int. Cl.
*G01S 11/10* (2006.01)
*G01S 5/02* (2010.01)

(52) U.S. Cl.
CPC .......... *G01S 11/10* (2013.01); *G01S 5/02* (2013.01)

(58) Field of Classification Search
CPC .......... G01S 11/10; G01S 5/02; G01S 11/02
See application file for complete search history.

(56) References Cited

U.S. PATENT DOCUMENTS

| | | |
|---|---|---|
| 2011/0287778 A1 | 11/2011 | Levin et al. |
| 2017/0324441 A1 | 11/2017 | Seller |
| 2018/0088205 A1 | 3/2018 | Shamain et al. |
| 2019/0049968 A1* | 2/2019 | Dean ............... G05D 1/617 |

FOREIGN PATENT DOCUMENTS

| | | |
|---|---|---|
| GB | 2388749 B | 11/2003 |
| WO | 2019072394 A1 | 4/2019 |

OTHER PUBLICATIONS

International Search Report and Written Opinion dated Feb. 25, 2021 for International Application No. PCT/SE2020/050402 filed Apr. 21, 2020; consisting of 11 pages.
EPO Communication with Supplementary European Search Report dated Dec. 22, 2023 for European Patent Application No. 20932252.8, consisting of 10 pages.

(Continued)

*Primary Examiner* — Diane D Mizrahi
(74) *Attorney, Agent, or Firm* — Weisberg I.P. Law, P.A.

(57) ABSTRACT

A method for kinematic state estimation of a UE in a wireless communication system. The method includes estimating of a kinematic state having two-dimensional position, two-dimensional velocity and a frequency bias of the UE. The estimation is based on and fully enabled by obtained measurements of Doppler shifts, relative two different antennas of the wireless communication system, of radio signals transmitted from the UE, and obtained distance-establishing measurements associated with the UE. A network node performing the method and a computer program therefore are also presented.

21 Claims, 15 Drawing Sheets

(56) References Cited

OTHER PUBLICATIONS

Y. Bar-Shalom et al.; Tracking with Classification-Aided Multiframe Data Association; IEEE Transactions on Aerospace and Electronic Systems, vol. 41, No. 3; Jul. 2005, consisting of 11 pages.
A.F. Genovese; The Interacting Multiple Model Algorithm for Accurate State Estimation of Maneuvering Targets; Johns Hopkins APL Technical Digest, vol. 22, No. 4; Jan. 1, 2001, consisting of 10 pages.

* cited by examiner

USER EQUIPMENT TWO-DIMENSIONAL STATE ESTIMATION

CROSS-REFERENCE TO RELATED APPLICATION

This application is a Submission Under 35 U.S.C. § 371 for U.S. National Stage Patent Application of International Application Number: PCT/SE2020/050402, filed Apr. 21, 2020 entitled "USER EQUIPMENT TWO-DIMENSIONAL STATE ESTIMATION," the entirety of which is incorporated herein by reference.

TECHNICAL FIELD

The proposed technology generally relates to a method for kinematic state estimation of a user equipment in a wireless communication system, and a network node configured to estimate a kinematic state of a user equipment in a wireless communication system, and a computer program comprising instructions, which when executed by at least one processor, cause the at least one processor to estimate a kinematic state.

BACKGROUND

Positioning of a user equipment (UE) within wireless communication systems has been performed for many years and for many reasons. Information about a UE position can be used for enabling many different services to the users as well as more efficient control procedures. If reliable information about a velocity of a UE is provided as well, many additional services and control possibilities are opened.

There are many use cases were accurate estimates of the Cartesian two-dimensional (2D) position and velocity of a user equipment is critical. For instance, in a particular case, such information may be requested by the police tracking down suspected criminals and terrorists. For such a use, seamless availability, also indoors, is critical, together with accurate estimates of the position. Accurate velocity estimates are important as well, e.g. to provide evidence in case of car chases. In addition, the user of the UE should preferably not be able to disable the state estimation functionality.

In another situation, traffic flow may be the target. Traffic flow in cities, or crowd movement in case of larger accidents or societal unrest may be monitored and/or controlled by the estimation of large-scale movement patterns. This example benefits from accurate 2D position and velocity estimation for a majority of the existing UE. However, many UE vendors block e.g. all Assisted Global Navigation Satellite Systems (A-GNSS) positioning reporting from the UE to the cellular positioning node, in favour of reporting to their own servers, where the A-GNSS information is used to provide e.g. traffic prediction. This blocking makes it impossible for cellular operators to offer services like traffic flow predictions to cellular users. There is no way for the UE to disable the measurements needed for 2D state estimation.

In cases associated with rapidly moving UEs, the UEs may drop their connection before a handover is initiated. In such cases, seamless availability also indoors in trains, buses and tunnels is critical, together with accurate estimates of the position and velocity used for prediction of future handover capacity needs.

Previous methodology of useful accuracy performance include satellite based methods like the assisted global navigation satellite system (A-GNSS) and time difference of arrival positioning methods like the uplink time difference of arrival (U-TDOA) or the downlink counterpart observed time difference of arrival (OTDOA). However, such approaches have a number of disadvantages.

A-GNSS relies on an A-GNSS receiver hardware in the UE, whose operation may be conditionally denied by the user or UE vendor. In other words, the A-GNSS is not UE independent and availability may be switched off by the user or vendor for certain services. The method further relies on either UE stand-alone operation or positioning node reporting, i.e. the position and velocity information is typically unavailable in a base station. A-GNSS has furthermore inferior availability, in particular indoors.

U-TDOA does not, as such, provide velocity information. This methodology has furthermore poor availability, due to detectability requirements in at least 4 base stations.

O-TDOA does not, as such, provide velocity information. The methodology relies on UE measurements, that may be denied by the user or UE vendor for certain services. The OTDOA method is thereby not UE independent, and availability may be switched off by the user or UE vendor. OTDOA relies on either UE stand-alone operation or positioning node reporting, i.e. the position and velocity information is unavailable in a base station. The methodology has low availability, due to detectability requirements in at least 4 base stations.

See furthermore A. Kangas, I. Siomina and T. Wigren, "Positioning in LTE"—in S. A. Zekavat and R. M. Buehrer (eds.), Handbook of Position Location: Theory, Practice and Advances, 2:nd Ed., February, 2019, pp. 1207-1216.

There is thus a need for a methodology providing position and velocity information with a good availability and without UE dependency. In order to enable a number of new Fourth Generation (4G) and Fifth Generation (5G) use cases, the kinematic state of a UE, i.e. its Cartesian position and velocity needs to be accurately known, at least in 2D space. The problem with prior art is that there is no state estimation algorithm or methodology that generates estimates of 2D position estimates with high accuracy, generates 2D velocity estimates with high accuracy and has a very high availability also indoors. Furthermore, there are no state estimation algorithms operating independently of the UE, UE receivers and UE measurements that may be disabled.

SUMMARY

It is an object to provide high-availability kinematic state estimation being independent of the type of UE.

This and other objects are met by embodiments of the proposed technology.

According to a first aspect, there is provided a method for kinematic state estimation of a UE in a wireless communication system. The method comprises estimating of a kinematic state comprising two-dimensional position, two-dimensional velocity and a frequency bias of the UE. The estimation is based on and fully enabled by obtained measurements of Doppler shifts, relative two different antennas of the wireless communication system, of radio signals transmitted from the UE, and obtained distance-establishing measurements associated with the UE.

According to a second aspect, there is provided a network node configured to estimate a kinematic state of a UE in a wireless communication system. The network node is configured to estimate a kinematic state comprising two-dimensional position, two-dimensional velocity and a frequency bias of the UE. The estimation is based on and fully enabled by measurements of obtained Doppler shifts, relative two different antennas of the wireless communication system, of radio signals transmitted from the UE, and obtained distance-establishing measurements associated with the UE.

According to a third aspect, there is provided a computer program comprising instructions, which when executed by at least one processor, cause the at least one processor to estimate a kinematic state comprising two-dimensional position, two-dimensional velocity and a frequency bias of the UE. The estimation is based on and fully enabled by measurements of obtained Doppler shifts, relative two different antennas of the wireless communication system, of radio signals transmitted from the UE, and obtained distance-establishing measurements associated with the UE.

According to a fourth aspect, there is provided a computer-program product comprising a computer-readable medium having stored thereon a computer program of the third aspect.

An advantage of the proposed technology is that a high-availability kinematic state estimation, independent of the type of UE, is provided. The method is operable on measurements obtained from only 2 base station sites. The method can furthermore be implemented entirely in the evolved NodeB (eNB) or New radio NodeB (gNB).

Other advantages will be appreciated when reading the detailed description. The consequences include that new 4G and 5G non-commercial use cases, e.g. in lawful intercept localization can be implemented with full performance. Commercial use cases currently blocked by UE vendor disabled A-GNSS, OTDOA or U-TDOA responses, can be offered to operator customers, including e.g. accurate traffic flow reporting. Enhanced cellular network functionality, like predictive handover, can be implemented with full performance.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

The present disclosure discloses a method for very accurate estimation of the complete kinematic UE state. The UE state is defined to be the 2-dimensional (2D) position and the 2D velocity vector. The methodology is thus intended for the majority of UEs that move on the ground. The invention disclosure is based on the understanding of how Doppler shift measurements could be used in kinematic state estimation. The methodology uses eNB/gNB uplink measurements on necessary air interface transmissions, in only the minimum number of 2 sites, thereby boosting availability and minimizing complexity. The estimation provides 2D kinematic information, directly usable for all features of the eNB/gNB. The methodology works irrespective of how the UE is designed or set up, in that no special UE hardware or software pre-requisites exist. Furthermore, the UE cannot disable the exploited air interface measurements of Timing Advance (TA), e.g. Round-Trip-Time (RTT), and Doppler shift. The method allows deployment in any generation base station, including 3G, 4G, 5G and xG (x>5) and provides excellent accuracy and availability with availability better than 90% in most regions, including indoors, 2D position inaccuracy better than 15 meters (1-sigma), and 2D velocity inaccuracy better than 1.5 meters/second (1-sigma).

In essence the properties of the disclosed method outperform existing positioning methods for moving UEs when the whole envelope of properties is considered. The method is, however, unsuitable to use for stationary UEs, which means that many of the IoT use cases cannot use the disclosed technology.

The present ideas are based on kinematic state estimation. For a better understanding of the proposed technology, it may be useful to begin with a brief overview of prior art within kinematic state estimation, provided in Appendix A.

The present ideas are further based on the insight that Doppler measurements of a UE obtained from two different sites and one additional distance-establishing measurement associated with the UE is sufficient to obtain a UE kinematic state defined to include the 2-dimensional (2D) position and the 2D velocity vector. The UE kinematic state further comprises a frequency bias of the UE.

In other words, a method for kinematic state estimation of a UE in a wireless communication system comprises estimation of a kinematic state comprising two-dimensional position, two-dimensional velocity and a frequency bias of the UE. The estimation is based on and fully enabled by obtained measurements of Doppler shifts, relative two different antennas of the wireless communication system, of radio signals transmitted from the UE, and obtained distance-establishing measurements associated with the UE.

Figure 3:
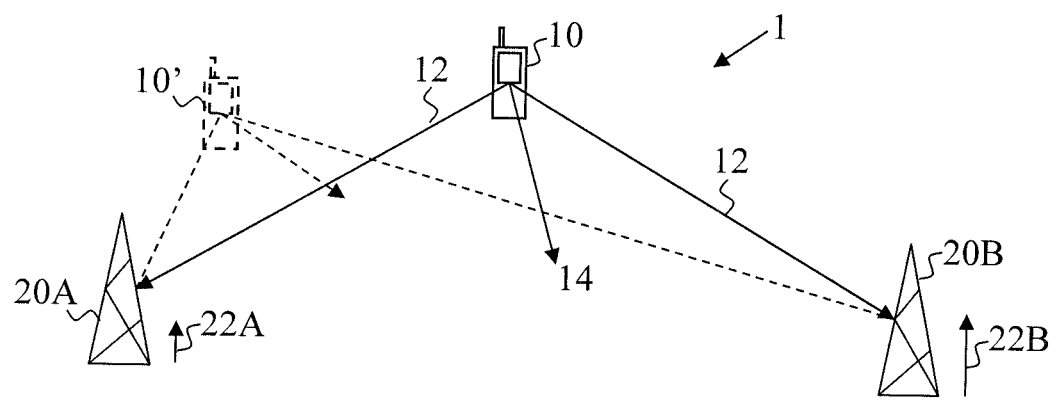
FIG. 3 illustrates Doppler measurements in a wireless communication system.

Doppler measurements have up to now basically been used as complementary measurements to other types of positioning methods. However, it has surprisingly been found that despite the lack of position or distance information in Doppler measurements, such information can indeed be achieved by a simple combination with only a single distance measurement. In FIG. 3, a wireless communication system 1 is schematically illustrated. Two base stations 20A and 20B are illustrated as well as a UE 10. The UE 10 is travelling with a velocity 14, causing Doppler shifts in the emitted signals 12 from the UE 10. These Doppler shifts are measured in the base stations 20A and 20B, illustrated as the arrows 22A and 22B, respectively. Starting only from these Doppler measurements, 22A and 22B, the position and velocity of the UE 10 cannot be established in an unambiguous way. A UE 10' positioned and travelling as indicated by the dotted lines will give the same measurement results. Not even with state estimation techniques, a well-determined position and velocity of the UE can be determined.

Figure 4:
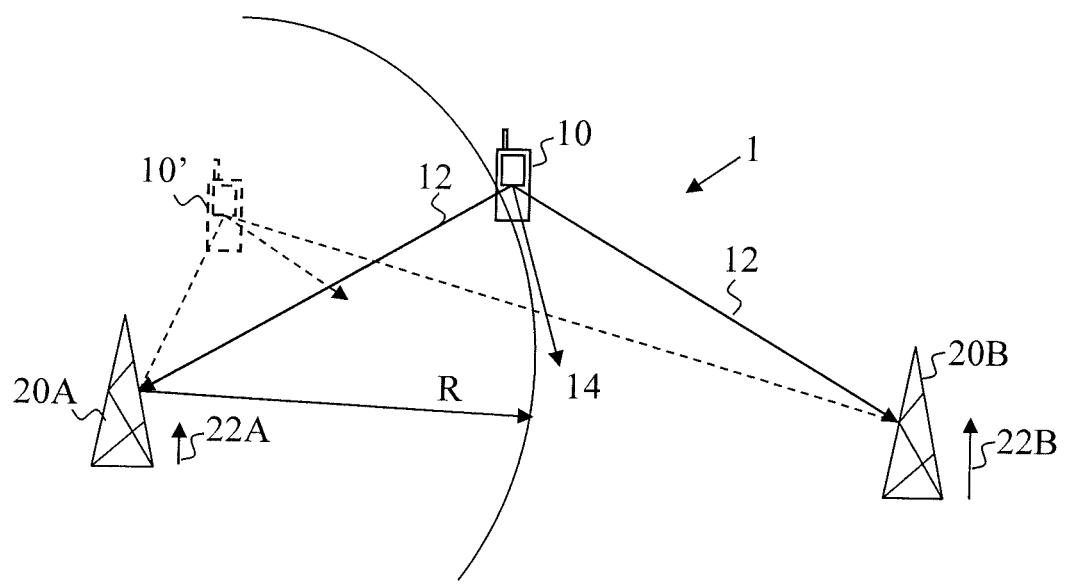
FIG. 4 illustrates Doppler measurements and a distance-establishing measurement in a wireless communication system.

In FIG. 4, a similar illustration is shown. However, here a distance-establishing measurement associated with the UE 10 is additionally available, indicating a distance R between the base station 20A and the UE 10. Typically, such a measurement is a TA measurement, but also other types of measurements, such as e.g. path loss and/or fingerprint positioning can be utilized. It can immediately be concluded that the position of the UE 10' is not compatible with the overall measurements. Other positions at the distance R can be ruled out due to the time behaviour as obtained from the estimations involving also the Doppler measurements.

It has thus surprisingly been found that the single distance-establishing measurement and Doppler shift measurements with respect to two base stations, together with a suitable kinematic state estimation is sufficient to provide an unambiguous estimation of the position as well as velocity of the UE in two dimensions. By sharing the information about measured Doppler frequencies among the base stations, each base station will be able to make such unambiguous estimations, since distance-establishing measurement are readily available in a typical base station.

It can thus be understood that it will be enough to have access to only one Doppler measurement besides the measurements that can be provided in the serving base station. Since Doppler measurements can be obtained from basically any kind of signaling, the present method is operable already in radio conditions where only one additional base station, besides the serving base station, is able to recognize radio signals from the UE. This means that the method will be operable in most situations, including most indoor and in-vehicle situations.

The only real limitation is the limitation of the kinematic state to be a two-dimensional state. However, in most situations, motions in the vertical direction are generally much smaller than in the lateral directions. The accuracy in positioning and velocity may be influenced by motions in the vertical direction, but in the majority of cases, such influences are small and can be neglected.

Figure 5:
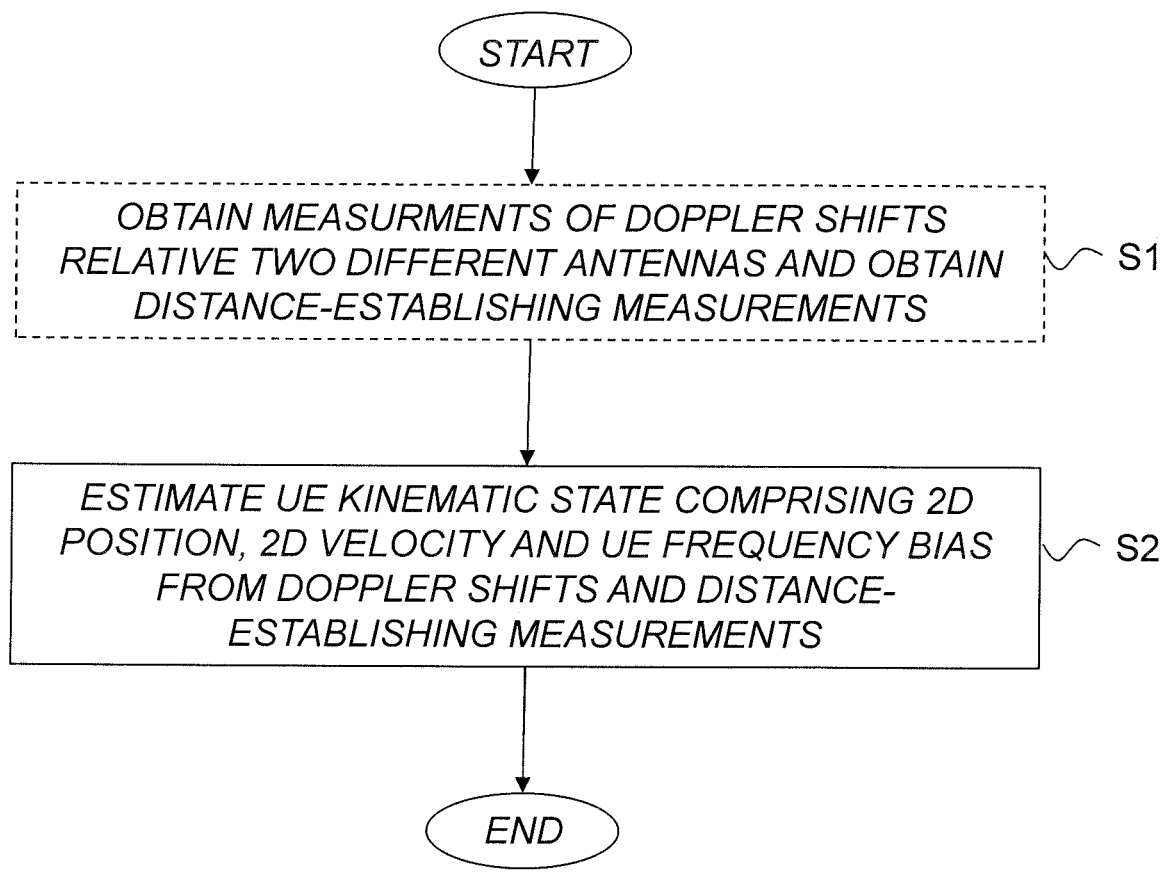
FIG. 5 is a flow diagram of steps of an embodiment of a method for kinematic state estimation of a UE in a wireless communication system.

FIG. 5 illustrates a flow diagram of steps of an embodiment of a method for kinematic state estimation of a UE in a wireless communication system. In step S2, a kinematic state is estimated. The kinematic state comprises two-dimensional position, two-dimensional velocity and a frequency bias of the UE. The estimation is based on and fully enabled by obtained measurements of Doppler shifts, relative two different antennas of the wireless communication system, of radio signals transmitted from the UE, and obtained distance-establishing measurements associated with the UE.

The Doppler shifts are typically measured in base stations of the wireless communication system. The measurements that are not directly available to the node performing the estimation are communicated thereto, whereby the node performing the estimation is configured to obtain these measurements. Also, the distance-establishing measurements are typically performed at or at least in communicational connection to a base station. Also such measurements, if not directly available, are communicated to the node performing the estimation, whereby the node performing the estimation is configured to obtain also these measurements.

Figure 6:
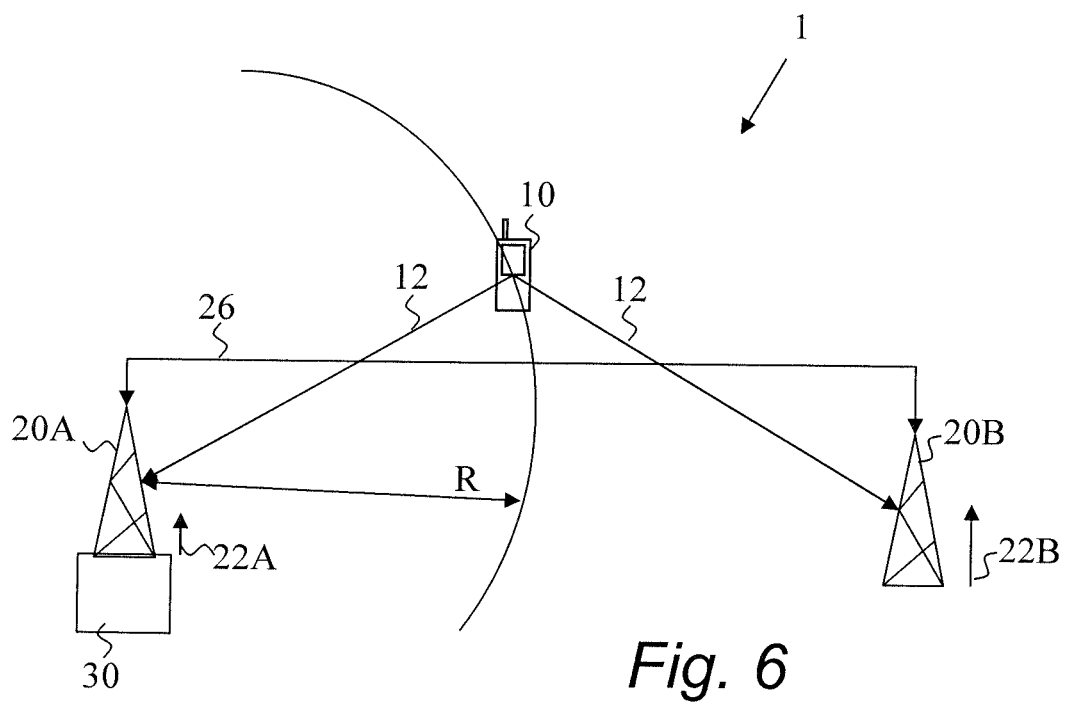
FIG. 6 is a schematic illustration of an embodiment of a location of a node for kinematic state estimation of a UE in a wireless communication system.

FIG. 6 illustrates schematically a wireless communication system 1 having two base stations 20A and 20B. The base station 20A comprises a network node 30 that is configured to perform the estimation. This network node 30 obtains directly the Doppler measurements and the distance-establishing measurements made by the base station 20A. The Doppler measurements made by the base station 20B are communicated 26 to the network node 30, either via the base station 20A or directly. The network node 30 thereby obtains also such second site Doppler measurements and is thereby enabled to perform the estimation.

Figure 7:
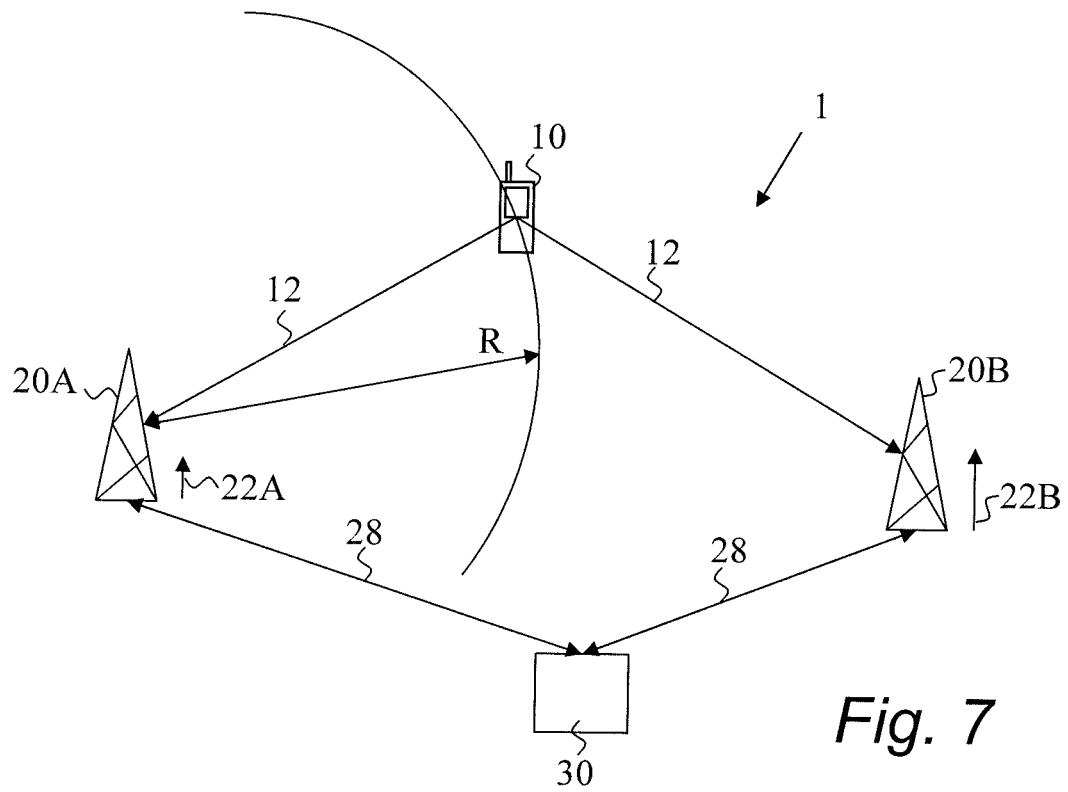
FIG. 7 is a schematic illustration of another embodiment of a location of a node for kinematic state estimation of a UE in a wireless communication system.

FIG. 7 illustrates schematically a wireless communication system 1 having two base stations 20A and 20B. The network node 30 that is configured to perform the estimation is here provided 28 separate from both base stations 20A, 20B. This network node 30 therefore obtains both sets of Doppler measurements and the distance-establishing measurements from the respective base stations. The network node 30 is thereby enabled to perform the estimation.

Returning to FIG. 5, in a preferred embodiment, the method also comprises the step S1, in which measurements of Doppler shifts as measured at two different sites are obtained and in which distance-establishing measurements obtained at one site are obtained. As mentioned before, the distance-establishing measurements are preferably selected among timing advance, path loss and fingerprint positioning. Most preferably, the distance-establishing measurements are timing advance measurements.

Here below, a preferred embodiment of the estimation is described. This preferred embodiment method is a dual site, dual mode Interacting Multiple Model (IMM) algorithm.

The disclosed algorithm is defined in terms of the components of the algorithm, disclosed below.

The embodiment is based on a 2D Movement model. In the present embodiment, the basis for movement modeling are two continuous-time constant-velocity models with acceleration noise that together form a multiple mode model in an IMM filter. One mode uses a very small, or zero, acceleration noise, while the other maneuvering mode uses a large acceleration noise. There is one extra state intended to estimate the frequency bias of the UE. This state is the same for both models. Such a feature is not known from any prior art modeling. This bias is modeled as a random walk.

In other words, in one embodiment, the estimation is performed utilizing continuous-time models. In a preferred embodiment, the estimating is performed utilizing two movement models, wherein both movement models are constant continuous-time constant-velocity models with acceleration noise. The acceleration noise of one of the two movement models is larger than for the other one of the two movement models.

The movement modes are described by the following stochastic differential equations:

$$dx^1(t) = \begin{pmatrix} 0 & 0 & 1 & 0 & 0 \\ 0 & 0 & 0 & 1 & 0 \\ 0 & 0 & 0 & 0 & 0 \\ 0 & 0 & 0 & 0 & 0 \\ 0 & 0 & 0 & 0 & 0 \end{pmatrix} x^1(t)dt + \begin{pmatrix} 0 & 0 & 0 \\ 0 & 0 & 0 \\ 1 & 0 & 0 \\ 0 & 1 & 0 \\ 0 & 0 & 1 \end{pmatrix} w^1(t)dt \quad (1)$$

$$E[(w^1(t)dt(w^1(s)ds)] = \begin{pmatrix} q^1_{11} & 0 & 0 \\ 0 & q^1_{22} & 0 \\ 0 & 0 & q_{bias} \end{pmatrix} \delta(t-s)dt \quad (2)$$

$$dx^2(t) = \begin{pmatrix} 0 & 0 & 1 & 0 & 0 \\ 0 & 0 & 0 & 1 & 0 \\ 0 & 0 & 0 & 0 & 0 \\ 0 & 0 & 0 & 0 & 0 \\ 0 & 0 & 0 & 0 & 0 \end{pmatrix} x^2(t)dt + \begin{pmatrix} 0 & 0 & 0 \\ 0 & 0 & 0 \\ 1 & 0 & 0 \\ 0 & 1 & 0 \\ 0 & 0 & 1 \end{pmatrix} w^2(t)dt \quad (3)$$

$$E[(w^2(t)dt(w^2(s)ds)] = \begin{pmatrix} q^2_{11} & 0 & 0 \\ 0 & q^2_{22} & 0 \\ 0 & 0 & q_{bias} \end{pmatrix} \delta(t-s)dt \quad (4)$$

In these equations the superscripts 1 and 2 denote the modes, not squaring. x denotes the state vector, w denotes the systems noise, $q_{11}$ is the variance of the acceleration noise in the x-dimension, $q_{22}$ is the variance of the acceleration noise in the y-dimension, and $q_{bias}$ is a the variance of the drift rate of the UE frequency bias. $\delta(t-s)$ denotes Dirac's delta function. The state vector components are selected as follows. $x_1$ denotes the first position coordinate, $x_2$ denotes the second position coordinate, $x_3$ denotes the first velocity coordinate, $x_4$ denotes the second velocity coordinate, while $x_5$ denotes the UE frequency bias.

See e.g. Y. Bar-Shalom and X. R. Li, Estimation and Tracking—Principles, Techniques and Software, pp. 262-263, Norwood, MA, Artech House, 1993.

Since the IMM filtering algorithm is given in discrete time, the continuous-time movement models above need to be sampled. Using $T_k = t_k - t_{k-1}$ to denote the time varying sampling interval, a sampling of the models above renders the following movement models:

$$A^1(t_k, t_{k-1}) = \begin{pmatrix} 1 & 0 & T_k & 0 & 0 \\ 0 & 1 & 0 & T_k & 0 \\ 0 & 0 & 1 & 0 & 0 \\ 0 & 0 & 0 & 1 & 0 \\ 0 & 0 & 0 & 0 & 1 \end{pmatrix} \quad (5)$$

$$Q^1(t_k, t_{k-1}) = \begin{pmatrix} 1/3\, q^1_{11} T_k^3 & 0 & 1/2\, q^1_{11} T_k^2 & 0 & 0 \\ 0 & 1/3\, q^1_{22} T_k^3 & 0 & 1/2\, q^1_{22} T_k^2 & 0 \\ 1/2\, q^1_{11} T_k^2 & 0 & q^1_{11} T_k & 0 & 0 \\ 0 & 1/2\, q^1_{22} T_k^2 & 0 & q^1_{22} T_k & 0 \\ 0 & 0 & 0 & 0 & q_{bias} T_k \end{pmatrix} \quad (6)$$

$$A^2(t_k, t_{k-1}) = \begin{pmatrix} 1 & 0 & T_k & 0 & 0 \\ 0 & 1 & 0 & T_k & 0 \\ 0 & 0 & 1 & 0 & 0 \\ 0 & 0 & 0 & 1 & 0 \\ 0 & 0 & 0 & 0 & 1 \end{pmatrix} \quad (7)$$

$$Q^2(t_k, t_{k-1}) = \begin{pmatrix} 1/3\, q^2_{11} T_k^3 & 0 & 1/2\, q^2_{11} T_k^2 & 0 & 0 \\ 0 & 1/3\, q^2_{22} T_k^3 & 0 & 1/2\, q^2_{22} T_k^2 & 0 \\ 1/2\, q^2_{11} T_k^2 & 0 & q^2_{11} T_k & 0 & 0 \\ 0 & 1/2\, q^2_{22} T_k^2 & 0 & q^2_{22} T_k & 0 \\ 0 & 0 & 0 & 0 & q_{bias} T_k \end{pmatrix} \quad (8)$$

See e.g. Y. Bar-Shalom and X. R. Li, Estimation and Tracking—Principles, Techniques and Software, pp. 461-470, Norwood, MA, Artech House, 1993 for details.

This concludes the design of the dynamic parts of the mode models for the IMM filter.

In the present embodiment, RTT measurements are assumed as distance-establishing measurements. The measurement model thereby becomes:

$$\hat{z}^i(\hat{x}^i) = h(\hat{x}^i) = \frac{2}{c} \sqrt{(\hat{x}^i_1 - x_{s,1})^2 + (\hat{x}^i_2 - x_{s,2})^2 + (0 - x_{s,3})^2}. \quad (9)$$

Here $\hat{z}^i(\hat{x}^i)$ denotes the measurement model for mode i. Note that the height of the base station tower is normally known ($x_{s,3}$), hence tower height is accounted for. In case the tower height would be unknown, it may be replaced by 0. The coordinates for the base station antenna at site s, is thus $(x_{s,1}\ x_{s,2}\ x_{s,3})^T$.

The measurement covariance matrix assumption needs to be added here. In fact, the implementation performs irregular, scalar measurement updates, hence the measurement covariance matrix is also scalar and equal to $r_{RTT}^i$.

A measurement model for Doppler shift measurements also has to be formulated. As stated above, the UE frequency bias is modeled as a random walk, and the mode states are augmented with one extra state $x_5$ that models the UE frequency bias. The Doppler shift measurements are hence:

$$z(t_k) = \frac{fc}{c} v_s(t_k) + x_{bias}(t_k), \quad (10)$$

where $v_s(t_k)$ denotes the speed with which the distance between the site s and the UE increases. c denotes the speed of light. Note that the UE frequency bias is the same for all sites and movement modes.

To relate the measured Doppler shift to the estimated states in a measurement equation, it is noted that a simple scalar product computation, between the rate of the UE ($\dot{r}$) and the direction vector between a site s and the UE ($\hat{r} - r_s$) leads to $$v_s(\hat{x}) = -\frac{(\hat{r} - r_s)}{\|\hat{r} - r_s\|} \cdot \dot{r} \quad (11)$$

The negative sign is introduced since the Doppler shift is positive when the UE approaches the base station, for physical reasons. Since it is assumed that the UE moves at zero altitude, the range rate equation leads to:

$$v_s(\hat{x}) = -\frac{(\hat{r}-r_s)}{\|\hat{r}-r_s\|} \cdot \dot{r} = -\frac{(\hat{x}_1 - x_{s,1})\hat{x}_3 + (\hat{x}_2 - x_{s,2})\hat{x}_4}{\sqrt{(\hat{x}_1 - x_{s,1})^2 + (\hat{x}_2 - x_{s,2}) + (0 - x_{s,3})}}. \quad (12)$$

Note that the height of the base station tower is normally known, hence height is accounted for. The measurement equation for one Doppler shift measurement made at site s thus becomes:

$$\dot{z}^i(\hat{x}^i) = h(\hat{x}^i) = -\frac{f_c}{c} \frac{\left((\hat{x}_1^i - x_{s,1})\hat{x}_3^i + (\hat{x}_2^i - x_{s,2})\hat{x}_4^i\right)}{\sqrt{(\hat{x}_1^i - x_{s,1})^2 + (\hat{x}_2^i - x_{s,2})^2 + (0 - x_{s,3})^2}} + \hat{x}_5^i. \quad (13)$$

The measurement equation is evaluated using predicted states as indicted in the Extended Kalman filter (EKF) iteration equations, however, the time dependence is not shown here. The measurement covariance matrix assumption needs to be added here. In fact, the implementation performs irregular, scalar measurement updates, hence the measurement covariance matrix is also scalar and equal to $r_{f\_D}^i$.

An additional step needed in this embodiment is measurement model linearization.

A straightforward differentiation of the RTT measurement equation gives:

$$\frac{\partial h(\hat{x})}{\partial \hat{x}}\Big|_{\hat{x}=\hat{x}^i} = \begin{pmatrix} \frac{\partial h(\hat{x})}{\partial \hat{x}_1} & \frac{\partial h(\hat{x})}{\partial \hat{x}_2} & 0 & 0 & 0 \end{pmatrix}_{|\hat{x}=\hat{x}^i} \quad (14)$$

where $$\frac{\partial h(\hat{x})}{\partial \hat{x}_1}\Big|_{\hat{x}=\hat{x}^i} = \frac{2}{c} \frac{(\hat{x}_1^i - x_{s,1})}{\sqrt{(\hat{x}_1^i - x_{s,1})^2 + (\hat{x}_2^i - x_{s,2})^2 + (0 - x_{s,3})^2}} \quad (15)$$

$$\frac{\partial h(\hat{x})}{\partial \hat{x}_2}\Big|_{\hat{x}=\hat{x}^i} = \frac{2}{c} \frac{(\hat{x}_2^i - x_{s,2})}{\sqrt{(\hat{x}_1^i - x_{s,1})^2 + (\hat{x}_2^i - x_{s,2})^2 + (0 - x_{s,3})^2}} \quad (16)$$

A straightforward differentiation of the Doppler shift measurement equation gives:

$$\frac{\partial h(\hat{x})}{\partial \hat{x}}\Big|_{\hat{x}=\hat{x}^i} = \begin{pmatrix} \frac{\partial h(\hat{x})}{\partial \hat{x}_1} & \frac{\partial h(\hat{x})}{\partial \hat{x}_2} & \frac{\partial h(\hat{x})}{\partial \hat{x}_3} & \frac{\partial h(\hat{x})}{\partial \hat{x}_4} & \frac{\partial h(\hat{x})}{\partial \hat{x}_5} \end{pmatrix}_{|\hat{x}=\hat{x}^i}, \quad (17)$$

where $$\frac{\partial h(\hat{x})}{\partial \hat{x}_1}\Big|_{\hat{x}=\hat{x}^i} = -\frac{f_c}{c} \frac{\hat{x}_3^i}{\sqrt{(\hat{x}_1^i - x_{s,1})^2 + (\hat{x}_2^i - x_{s,2})^2 + (0 - x_{s,3})^2}} + \frac{f_c}{c} \frac{(\hat{x}_1^i - x_{s,1})\left((\hat{x}_1^i - x_{s,1})\hat{x}_3^i + (\hat{x}_2^i - x_{s,2})\hat{x}_4^i\right)}{\left((\hat{x}_1^i - x_{s,1})^2 + (\hat{x}_2^i - x_{s,2})^2 + (0 - x_{s,3})^2\right)^{\frac{3}{2}}}, \quad (18)$$

$$\frac{\partial h(\hat{x})}{\partial \hat{x}_2}\Big|_{\hat{x}=\hat{x}^i} = -\frac{f_c}{c} \frac{\hat{x}_4^i}{\sqrt{(\hat{x}_1^i - x_{s,1})^2 + (\hat{x}_2^i - x_{s,2})^2 + (0 - x_{s,3})^2}} + \frac{f_c}{c} \frac{(\hat{x}_2^i - x_{s,2})\left((\hat{x}_1^i - x_{s,1})\hat{x}_3^i + (\hat{x}_2^i - x_{s,2})\hat{x}_4^i +\right)}{\left((\hat{x}_1^i - x_{s,1})^2 + (\hat{x}_2^i - x_{s,2})^2 + (0 - x_{s,3})^2\right)^{\frac{3}{2}}}, \quad (19)$$

$$\frac{\partial h(\hat{x})}{\partial \hat{x}_3}\Big|_{\hat{x}=\hat{x}^i} = -\frac{f_c}{c} \frac{(\hat{x}_1^i - x_{s,1})}{\sqrt{(\hat{x}_1^i - x_{s,1})^2 + (\hat{x}_2^i - x_{s,2})^2 + (0 - x_{s,3})^2}}, \quad (20)$$

$$\frac{\partial h(\hat{x})}{\partial \hat{x}_4}\Big|_{\hat{x}=\hat{x}^i} = -\frac{f_c}{c} \frac{(\hat{x}_2^i - x_{s,2})}{\sqrt{(\hat{x}_1^i - x_{s,1})^2 + (\hat{x}_2^i - x_{s,2})^2 + (0 - x_{s,3})^2}}, \quad (21)$$

$$\frac{\partial h(\hat{x})}{\partial \hat{x}_5}\Big|_{\hat{x}=\hat{x}^i} = 1. \quad (22)$$

Since the measurements are typically obtained asynchronously, it may be advantageous to start with continuous time models followed by explicit sampling. This is the reason behind the continuous time dynamic movement models of the UE. However, the same thing is true for the mode switching model. The problem is, however, that continuous time mode switching models are not available in prior art.

Such a continuous time mode switching model is therefore disclosed here. The continuous time mode switching model can then be irregularly resampled every time a new measurement arrives.

The continuous time model needs to reflect that the net increase of each mode probability equals the sum of diffused probability from the other modes minus the diffusion from the own mode. A reasonable model for the diffused mode probability from mode i is the product of a mode unique diffusion rate parameter, $\Delta_{ij}$, the time increment h, and the mode probability of the originating mode, $\mu_i(t)$. This gives the vector model:

$$\begin{pmatrix} \mu_1(t+h) \\ \vdots \\ \mu_n(t+h) \end{pmatrix} = \begin{pmatrix} \mu_1(t) \\ \vdots \\ \mu_n(t) \end{pmatrix} + \begin{pmatrix} \lambda_{11} & \cdots & \lambda_{1n} \\ \vdots & \ddots & \vdots \\ \lambda_{n1} & \cdots & \lambda_{nn} \end{pmatrix} h \begin{pmatrix} \mu_1(t) \\ \vdots \\ \mu_n(t) \end{pmatrix}. \quad (23)$$

A Rearrangement Gives:

$$\frac{1}{h}\left(\begin{pmatrix} \mu_1(t+h) \\ \vdots \\ \mu_n(t+h) \end{pmatrix} - \begin{pmatrix} \mu_1(t) \\ \vdots \\ \mu_n(t) \end{pmatrix}\right) = \begin{pmatrix} \lambda_{11} & \cdots & \lambda_{1n} \\ \vdots & \ddots & \vdots \\ \lambda_{n1} & \cdots & \lambda_{nn} \end{pmatrix} \begin{pmatrix} \mu_1(t) \\ \vdots \\ \mu_n(t) \end{pmatrix}. \quad (24)$$

The definition of the derivative then gives the vector ordinary differential equation (ODE):

$$\begin{pmatrix} \dot{\mu}_1(t) \\ \vdots \\ \dot{\mu}_n(t) \end{pmatrix} = \begin{pmatrix} \lambda_{11} & \cdots & \lambda_{1n} \\ \vdots & \ddots & \vdots \\ \lambda_{n1} & \cdots & \lambda_{nn} \end{pmatrix} \begin{pmatrix} \mu_1(t) \\ \vdots \\ \mu_n(t) \end{pmatrix}, \quad (25)$$

With Solution:

$$\begin{pmatrix} \mu_1(\tau) \\ \vdots \\ \mu_n(\tau) \end{pmatrix} = \exp\left(\begin{pmatrix} \lambda_{11} & \cdots & \lambda_{1n} \\ \vdots & \ddots & \vdots \\ \lambda_{n1} & \cdots & \lambda_{nn} \end{pmatrix} \tau\right) \begin{pmatrix} \mu_1(0) \\ \vdots \\ \mu_n(0) \end{pmatrix}. \quad (26)$$

This relation accomplishes the desired matrix relation. Here τ denotes time.

To describe this matrix further, the component-wise solution to the sampled continuous time mode transition probability matrix was first computed using MAPLE for 2 modes, assuming that 212=221 The result is given by the following equations:

$$D_1 = \lambda_{11} + \lambda_{22}, \tag{27}$$

$$D_2 = \sqrt{\lambda_{11}^2 + \lambda_{22}^2 - 2\lambda_{11}\lambda_{22} + 4\lambda_{12}^2}, \tag{28}$$

$$\left(\exp\begin{pmatrix}\lambda_{11}\tau & \lambda_{12}\tau \\ \lambda_{12}\tau & \lambda_{22}\tau\end{pmatrix}\right)_{11} = \frac{1}{2D_2}\left(D_2\left(e^{\frac{1}{2}(D_1+D_2)\tau} + e^{\frac{1}{2}(D_1-D_2)\tau}\right) + \right.$$
$$\left. (\lambda_{11} - \lambda_{22})\left(e^{\frac{1}{2}(D_1+D_2)\tau} - e^{\frac{1}{2}(D_1-D_2)\tau}\right)\right), \tag{29}$$

$$\left(\exp\begin{pmatrix}\lambda_{11}\tau & \lambda_{12}\tau \\ \lambda_{12}\tau & \lambda_{22}\tau\end{pmatrix}\right)_{12} = \left(\exp\begin{pmatrix}\lambda_{11}\tau & \lambda_{12}\tau \\ \lambda_{12}\tau & \lambda_{22}\tau\end{pmatrix}\right)_{21} = \frac{\lambda_{12}}{D_2}\left(e^{\frac{1}{2}(D_1+D_2)\tau} + e^{\frac{1}{2}(D_1-D_2)\tau}\right) \tag{30}$$

$$\left(\exp\begin{pmatrix}\lambda_{11}\tau & \lambda_{12}\tau \\ \lambda_{12}\tau & \lambda_{22}\tau\end{pmatrix}\right)_{22} = \frac{1}{2D_2}\left(D_2\left(e^{\frac{1}{2}(D_1+D_2)\tau} + e^{\frac{1}{2}(D_1-D_2)\tau}\right) + \right.$$
$$\left. (\lambda_{22} - \lambda_{11})\left(e^{\frac{1}{2}(D_1+D_2)\tau} - e^{\frac{1}{2}(D_1-D_2)\tau}\right)\right). \tag{31}$$

The result is too complicated to understand in detail, and it would require a numerical solution to compute the three unknowns. However, there are two additional constraints that are useful. First, for a stationary nonzero solution, the derivative is zero with the sum of probability equaling 1, which leads to:

$$\lambda_{11} = -\lambda_{12} \tag{32}$$

$$\lambda_{22} = -\lambda_{21}. \tag{33}$$

In addition, the diagonal elements of the discretized mode transition matrix used above are the same which means that the following equation is sometimes possible to use to restrict the solutions further, as:

$$\Delta_{11} = \lambda_{22}. \tag{34}$$

Making Use of the First Additional Constraint Gives:

$$\exp\begin{pmatrix}\lambda_{11}\tau & -\lambda_{11}\tau \\ -\lambda_{22}\tau & \lambda_{22}\tau\end{pmatrix} = \begin{pmatrix} \frac{\lambda_{22} + \lambda_{11}e^{(\lambda_{11}+\lambda_{22})\tau}}{\lambda_{11}+\lambda_{22}} & -\frac{\lambda_{11}(e^{(\lambda_{11}+\lambda_{22})\tau}-1)}{\lambda_{11}+\lambda_{22}} \\ -\frac{\lambda_{22}(e^{(\lambda_{11}+\lambda_{22})\tau}-1)}{\lambda_{11}+\lambda_{22}} & \frac{\lambda_{11} + \lambda_{22}e^{(\lambda_{11}+\lambda_{22})\tau}}{\lambda_{11}+\lambda_{22}} \end{pmatrix}. \tag{35}$$

Making Use Also of the Second Constraint Results in the Further Simplification to:

$$\exp\begin{pmatrix}\lambda_{11}\tau & -\lambda_{11}\tau \\ -\lambda_{11}\tau & \lambda_{11}\tau\end{pmatrix} = \begin{pmatrix} \frac{1}{2} + \frac{1}{2}e^{2\lambda_{11}\tau} & \frac{1}{2} - \frac{1}{2}e^{2\lambda_{11}\tau} \\ \frac{1}{2} - \frac{1}{2}e^{2\lambda_{11}\tau} & \frac{1}{2} + \frac{1}{2}e^{2\lambda_{11}\tau} \end{pmatrix}. \tag{36}$$

Since the disclosed IMM algorithm is intended to be applicable to irregularly sampled measurements, the sampled version of the mode switching matrix is needed. This is readily obtained, by replacing $\tau$ with $T_k = t_k - t_{k-1}$, as for the dynamic state models above. Hence, with respect to the IMM formalism given above, it follows that:

$$\mu_{i|j} = \exp\left(\begin{pmatrix}\lambda_{11} & \cdots & \lambda_{1n} \\ \vdots & \ddots & \vdots \\ \lambda_{n1} & \cdots & \lambda_{nn}\end{pmatrix}T_k\right). \tag{37}$$

In the simplified cases with additional conditions imposed the above become:

$$\mu_{i|j} = \exp\begin{pmatrix}\lambda_{11}T_k & -\lambda_{11}T_k \\ -\lambda_{22}T_k & \lambda_{22}T_k\end{pmatrix} = \begin{pmatrix} \frac{\lambda_{22} + \lambda_{11}e^{(\lambda_{11}+\lambda_{22})T_k}}{\lambda_{11}+\lambda_{22}} & -\frac{\lambda_{11}(e^{(\lambda_{11}+\lambda_{22})T_k}-1)}{\lambda_{11}+\lambda_{22}} \\ -\frac{\lambda_{22}(e^{(\lambda_{11}+\lambda_{22})T_k}-1)}{\lambda_{11}+\lambda_{22}} & \frac{\lambda_{11} + \lambda_{22}e^{(\lambda_{11}+\lambda_{22})T_k}}{\lambda_{11}+\lambda_{22}} \end{pmatrix}, \tag{38}$$

or $$\mu_{i|j} = \exp\begin{pmatrix}\lambda_{11}T_k & -\lambda_{11}T_k \\ -\lambda_{11}T_k & \lambda_{11}T_k\end{pmatrix} = \begin{pmatrix} \frac{1}{2} + \frac{1}{2}e^{2\lambda_{11}T_k} & \frac{1}{2} - \frac{1}{2}e^{2\lambda_{11}T_k} \\ \frac{1}{2} - \frac{1}{2}e^{2\lambda_{11}T_k} & \frac{1}{2} + \frac{1}{2}e^{2\lambda_{11}T_k} \end{pmatrix}, \tag{39}$$

respectively.

In other words, in one embodiment, the measurements of Doppler shifts and the distance-establishing measurements are associated with a respective measurement time, whereby for each measurement, the movements models are propagated to the respective measurement time.

In a further embodiment, the estimating is performed by IMM filtering using a continuous-time mode-switching model.

In other words, in one embodiment, the step of estimating a kinematic state comprises Extended Kalman Filtering.

All important components of the IMM state estimator is now defined, and the attention is turned to analysis of the possibility to solve the state estimation problem at hand, and to assess the performance.

An observability analysis can be made. To show why the method is capable of obtaining 2D state estimates of a UE, by using one RTT measurement and one Doppler shift measurement in one eNB/gNB, together with a Doppler shift measurement obtained in another eNB/gNB at another site, the concept of observability of linear systems can be used. A linear system of order n:

$$\dot{x} = Ax \tag{40}$$

$$y = Hx \tag{41}$$

is observable provided that $$\text{rank}(O) = \text{rank}\begin{pmatrix} H \\ HA \\ \vdots \\ HA^{n-1} \end{pmatrix} = n. \tag{42}$$

Next, the observability matrix for the 2-site, 3-measurement suite is studied numerically.

To study observability, the observability matrix 0 was evaluated using the linear state equations above, together with linearized measurement equations, for one of the two modes. As a tractable measure of observability, the minimum singular value, s, of the observability matrix was used, in the form of a logarithmic measure. A two site scenarios was considered, using the following base station positions:

$$S_1 = (200 \ 100 \ 5)^T m, \tag{43}$$

$$S_2 = (100 \ 40 \ 110)^T m. \tag{44}$$

In addition, the UE movement was assumed to be a constant velocity one, with:

$$\begin{pmatrix} x_3 \\ x_4 \end{pmatrix} = \begin{pmatrix} 5 \\ 10 \end{pmatrix} \text{m/s}. \tag{45}$$

First the situation with 2 Doppler measurements in two sites was studied. The logarithmic measure was:

$$10^{10} \log(s+10^{-20}), \tag{46}$$

where the last term is intended to avoid numerical problems by limiting the measure to be above −200. Thus, since the minimal singular value of the observability matrix is non-negative, a measure that equals −200 shows that the system is not observable, while values higher than −200 indicate that the system is observable.

Figure 8:
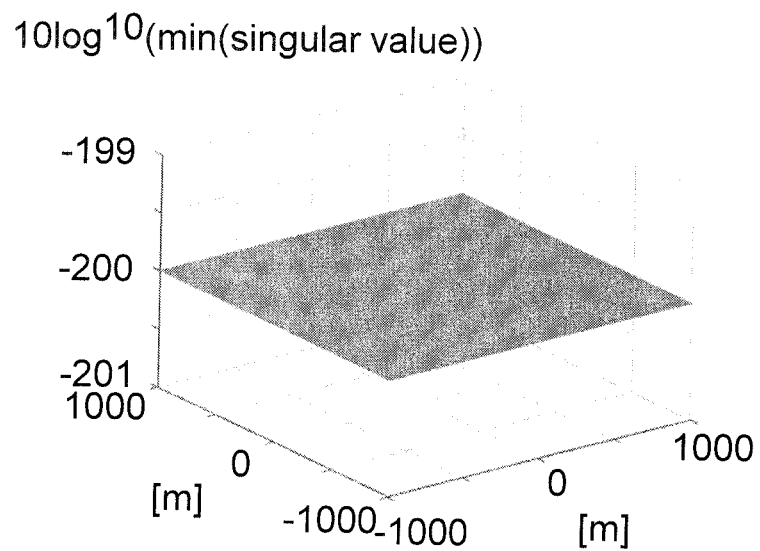
FIG. 8. illustrates the logarithmic measure of the minimum singular value of the observability matrix for two Doppler measurements.

The result for 2 Doppler shift measurements appears in FIG. 8. It can be seen that the system is not observable.

Figure 9:
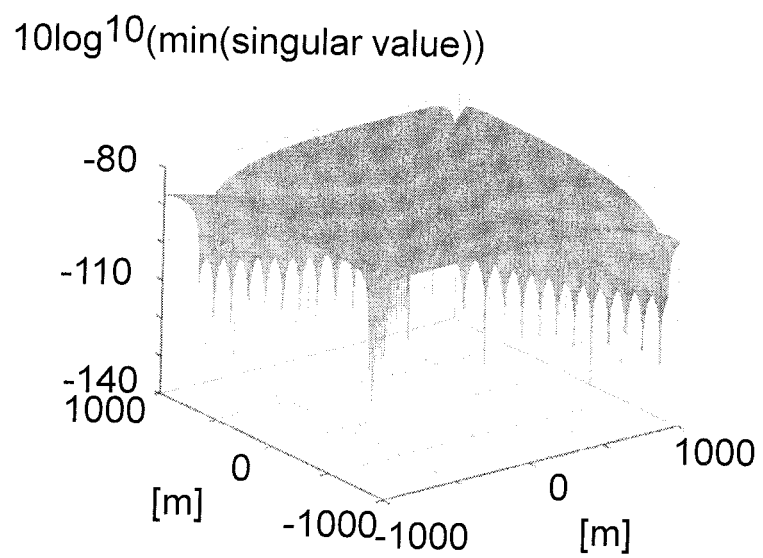
FIG. 9. illustrates the logarithmic measure of the minimum singular value of the observability matrix for two Doppler measurements and a distance-establishing measurement.

The result with one Doppler shift measurement and one RTT measurement in one site, and one Doppler shift measurement from another site appears in FIG. 9. It can be seen that the system is observable!

For a conclusion on the minimal number of sites, the following reasoning can be made. First, it can be noted that it is geometrically obvious that an RTT measurement and a Doppler shift measurement in one eNB/gNB, can only be used to measure and estimate the range and possibly the range rate between the eNB/gNB and the UE. There is no possibility to estimate a 2D Cartesian position from this information, also in case the UE is moving.

From above it is clear that in case one eNB/gNB in a site measures RTT and Doppler shift, and one additional eNB/gNB measures Doppler shift in another site—then a 2D Cartesian position can be estimated.

Together, this proves that in case Doppler shift measurements and RTT measurements are available, then 2 sites is the minimum number needed for a 2D state estimation. As will be seen below, the disclosed algorithm indeed performs excellently, thereby proving that the disclosed algorithm is able to perform well, based on measurements in a minimum number of sites (2). This is a key distinguishing feature of the method.

In order to test the performance of the algorithms according to the present embodiment, the algorithm was implemented in MATLAB. Also the data generation was simulated based on the UE trajectory in order to study the performance. The simulated UE trajectory, base station positions and UE velocities, appear in FIG. 10 and FIG. 11.

In the performance evaluation below, the two base stations closest to the UE generate the measurements used. The base stations positions were as follows:

$$S_1 = (200\ 100\ 5)^T m,$$

$$S_2 = (100\ 40\ 110)^T m,$$

$$S_3 = (800\ -50\ 70)^T m,$$

$$S_4 = (500\ -100\ 50)^T m,$$

$$S_5 = (50\ 200\ 180)^T m,$$

$$S_6 = (0\ 245\ 60)^T m,$$

$$S_7 = (-50\ 0\ 75)^T m.$$

Figure 10:
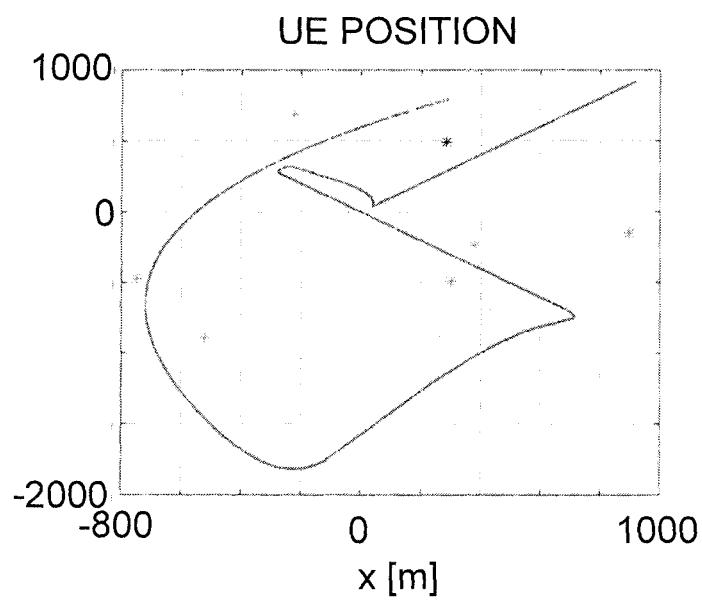
FIG. 10. illustrates a UE trajectory and base station locations of a simulation.

In addition, the UE frequency bias was set to 70 Hz. In FIG. 10, the UE trajectory is illustrated by a solid line and the base station locations as stars.

Figure 11:
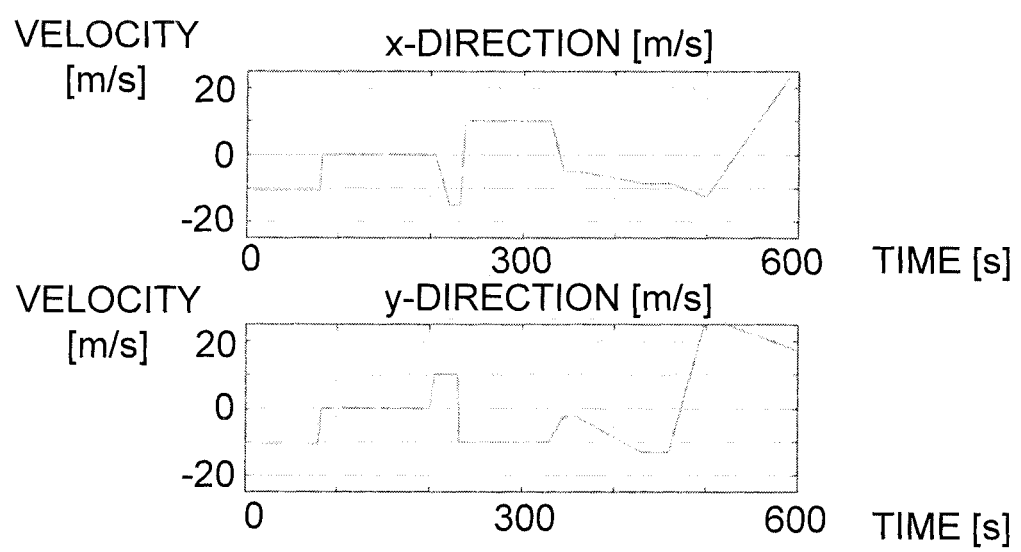
FIG. 11. illustrates UE velocity components for the simulation.

The UE velocity components were selected as illustrated in FIG. 11.

The disclosed IMM state estimator was parameterized according to Table 1.

TABLE 1

| Tuning parameters. | | |
|---|---|---|
| Parameter | Description | Value |
| $r^i$ | The assumed Doppler shift measurement standard deviation of mode i. Note: In case measurement SNR is estimated and signaled, $r^i$ may be set to the corresponding Doppler shift standard deviation value, for each measurement. | 5.0 Hz |
| $\sqrt{q_{11}^1}$ | Low bandwidth constant velocity mode acceleration systems noise. | 4.0 m/s$^2$ |
| $\sqrt{q_{22}^1}$ | Low bandwidth constant velocity mode acceleration systems noise. | 4.0 m/s$^2$ |
| $\sqrt{q_{11}^2}$ | High bandwidth constant velocity mode acceleration systems noise. | 25.0 m/s$^2$ |
| $\sqrt{q_{22}^2}$ | High bandwidth constant velocity mode acceleration systems noise. | 25.0 m/s$^2$ |
| $\sqrt{q_{bias}}$ | UE Doppler drift rate systems noise. | 1/180 Hz/s |
| $\lambda_{11}$ | The mode switch rate 1→1 | −0.20 s$^{-1}$ |
| $\lambda_{22}$ | The mode switch rate 2→2 | −0.10 s$^{-1}$ |

The performance was then evaluated for a number of combinations of Doppler shift measurement standard deviations and RTT measurement standard deviations. A sampling period of 2.0 s was applied. The results appear in FIGS. 12-14. An RTT standard deviation of 300 ns correspond to a range standard deviation of 50 m.

Figure 12:
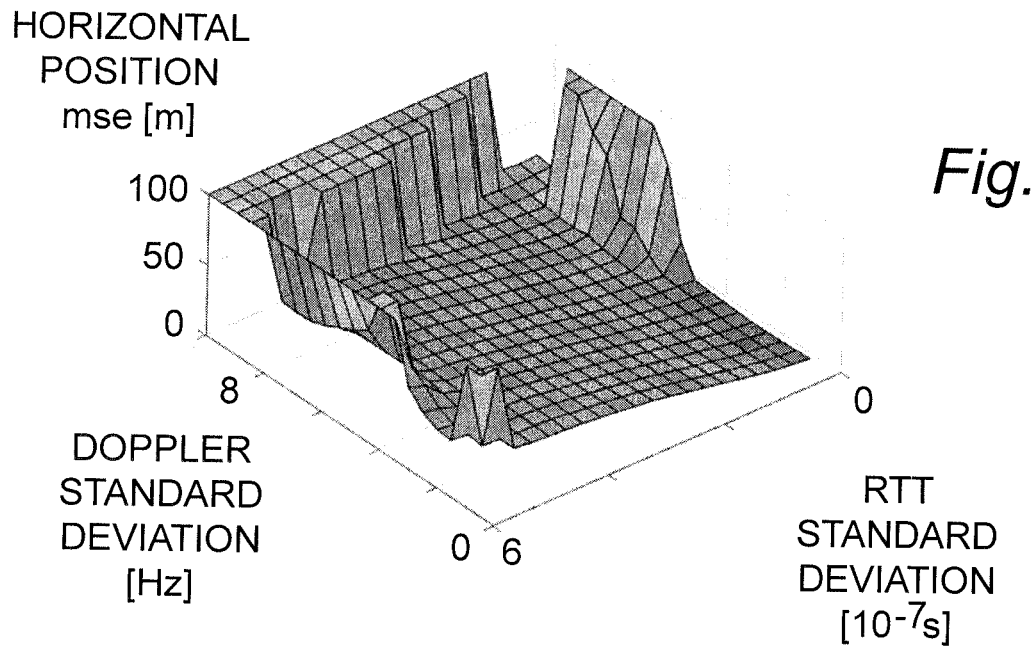
FIG. 12 illustrates horizontal position mean square error for the simulation.

FIG. 12 illustrates horizontal position mean square error as a function of the Doppler shift standard deviation and the RTT standard deviation. The sampling period is 2.0 s.

Figure 13:
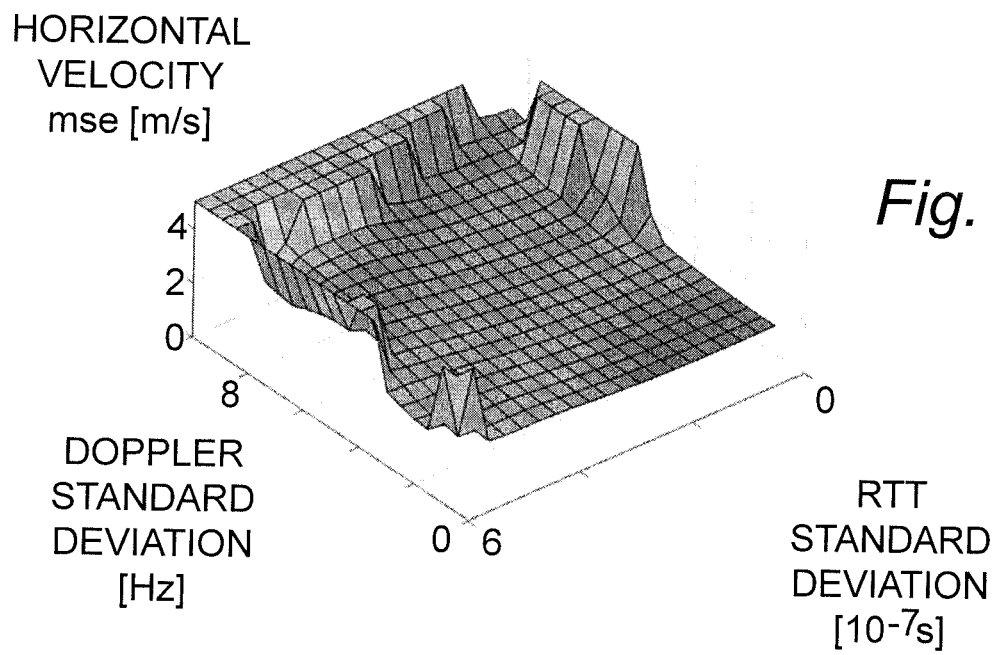
FIG. 13 illustrates horizontal velocity mean square error for the simulation.

FIG. 13 illustrates horizontal velocity mean square error as a function of the Doppler shift standard deviation and the RTT standard deviation. The sampling period is 2.0 s.

Figure 14:
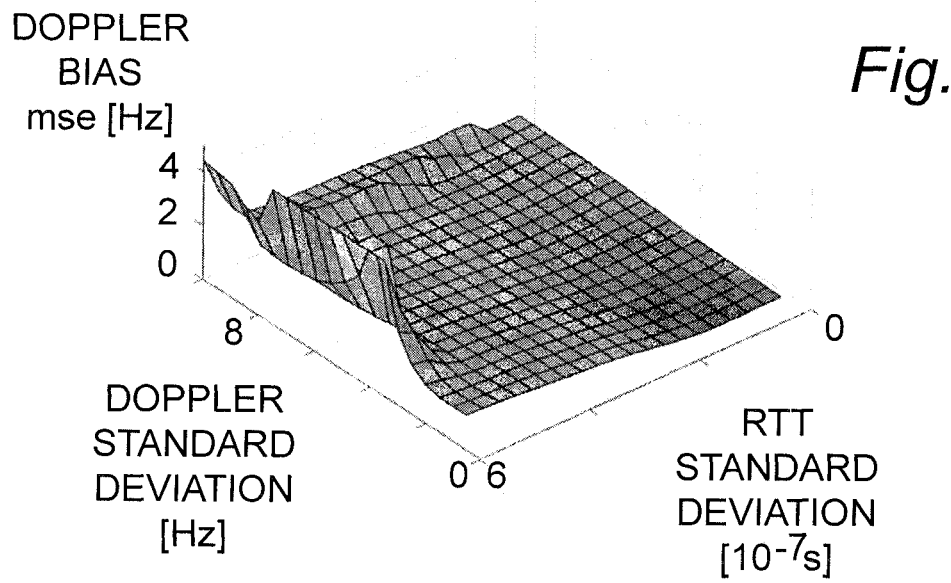
FIG. 14 illustrates frequency bias mean square error for the simulation.

FIG. 14 illustrates frequency bias mean square error as a function of the Doppler shift standard deviation and the RTT standard deviation. The sampling period is 2.0 s.

It can be concluded that the algorithm performs very well for a large range of measurement inaccuracies. Position minimum mean-square error (mmse) below 15 m and velocity mmse below 1.5 m/s are often achieved.

To further illustrate the performance of the disclosed IMM estimator of the present embodiment, the trajectory and time evolution of the data used for estimation and the estimated state are depicted in FIGS. 15-19. Again, it can be concluded that the IMM estimator performance is very satisfactory. Note that the two closest sites are used as measurement sources of the IMM estimator, at each point in time.

Figure 15:
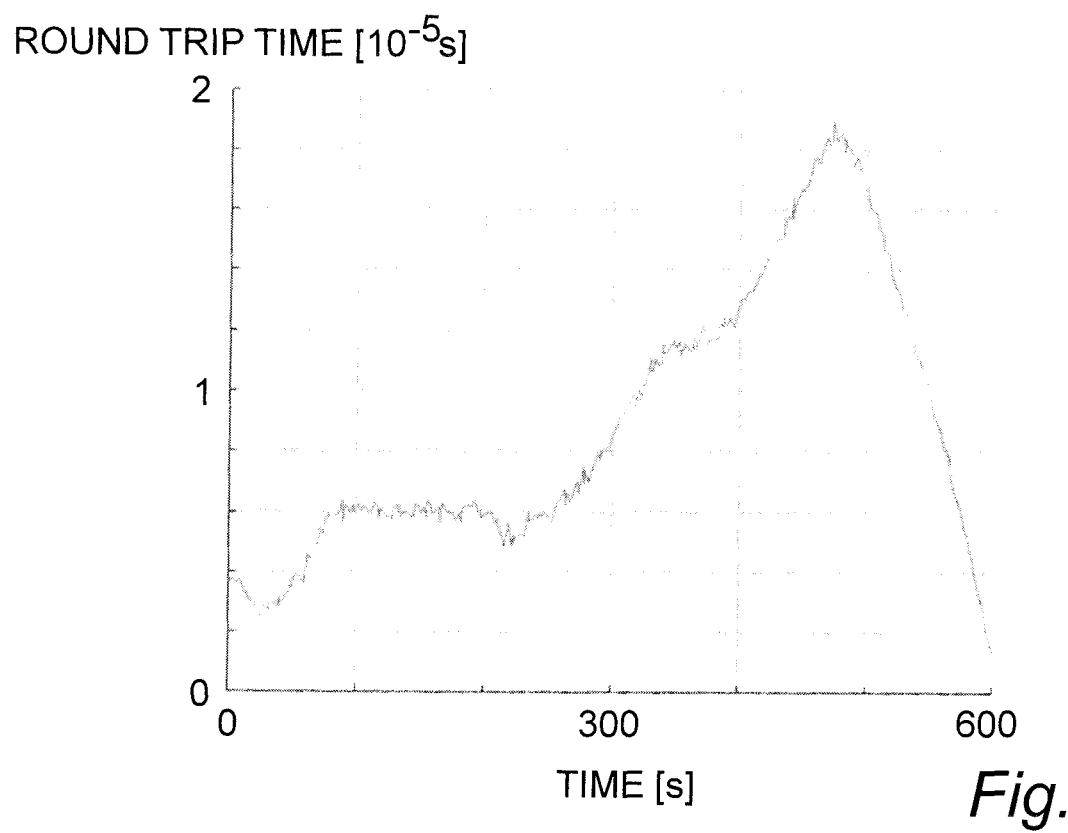
FIG. 15 illustrates simulated round-trip-time data.

FIG. 15 illustrates RTT data from one base station site, using a sampling period of 2.0 s and a standard deviation of 200 ns.

Figure 16:
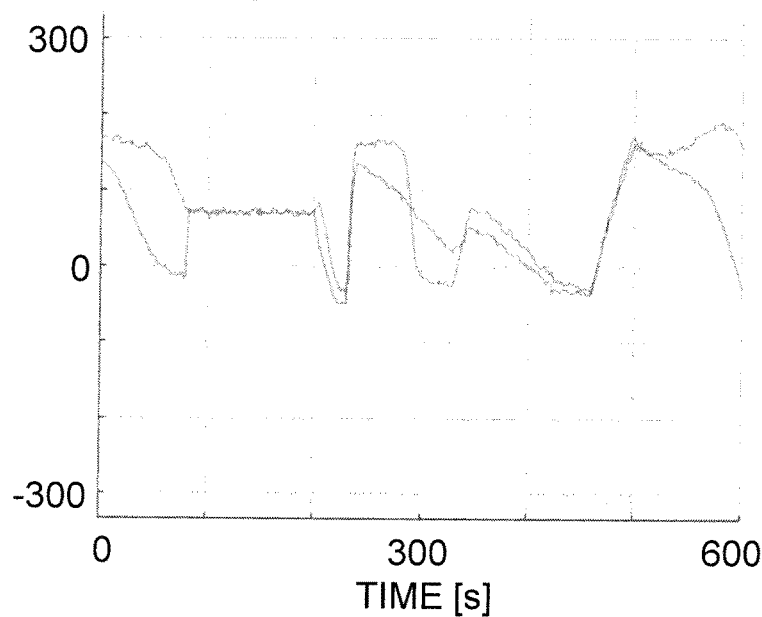
FIG. 16 illustrates simulated Doppler shift data.

FIG. 16 illustrates Doppler shift data from two base station sites, using a sampling period of 1.0 s and a standard deviation of 6 Hz.

Note that in the simulation, RTT data and one of the Doppler shift data are always collected from the closest base station, whereas the second Doppler shift data is collected from the second closest base station. This means that the curves of FIGS. 15 and 16 only are used for a part of the entire simulation, when the site in question is the closest or second closest site.

Figure 17:
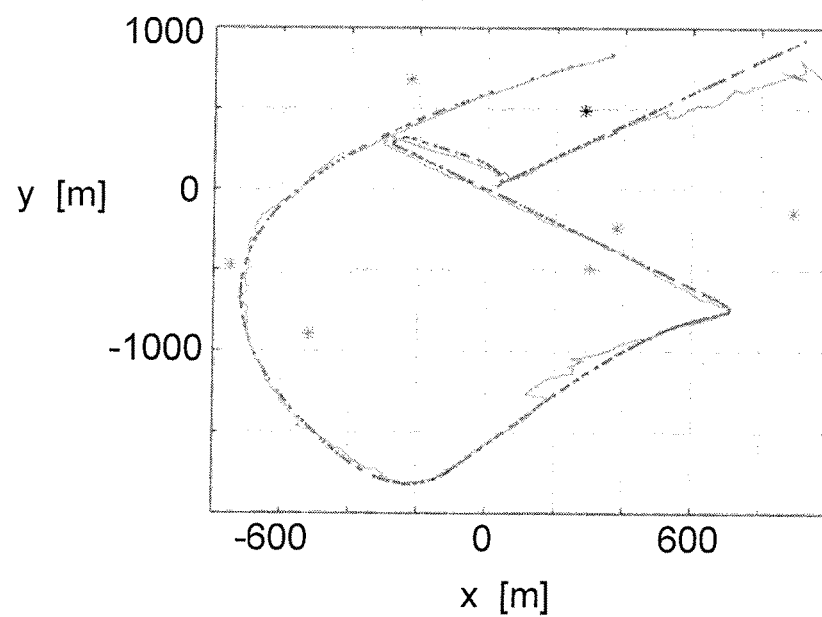
FIG. 17 illustrates true and estimated trajectory, of the simulation.

FIG. 17 illustrates true and estimated trajectory, illustrated by a dotted and a full line, respectively.

Figure 18:
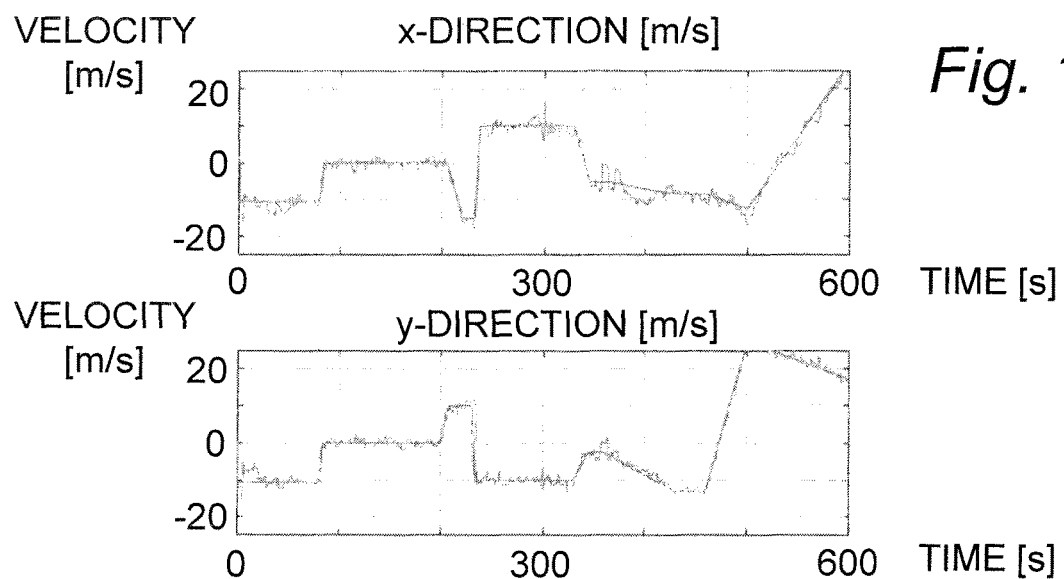
FIG. 18 illustrates the time evolution of the true and estimated velocity components of the simulation.

FIG. 18 illustrates the time evolution of the true and estimated velocity components.

Figure 19:
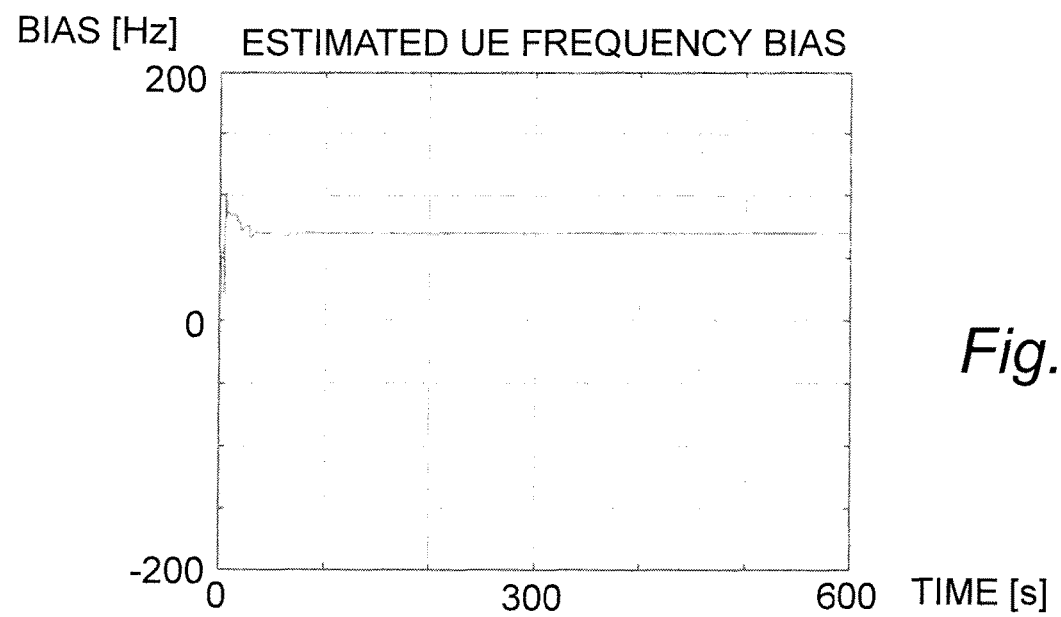
FIG. 19 illustrates the time evolution of the frequency bias estimate of the simulation.

FIG. 19 illustrates the time evolution of the frequency bias estimate.

Clearly, there is a need for signaling of Doppler shift measurements between base stations and/or nodes performing the estimation, typically eNBs and gNBs. This signaling can use so called X2 and Xn Private messaging.

The performance of the present method opens up for new use cases. High accuracy E-911 positioning today typically uses A-GNSS, or a fallback method like OTDOA or U-TDOA. For this use case, availability also indoors is critical, together with accurate estimates of the position, but also velocity information may be useful in case accidents occur in buses, trains or cars. Normally, E-911 positioning is initiated after an accident or incident has occurred. This means that position and velocity estimates are unavailable prior to the accident/incident, in particular since mobile vendors typically disable A-GNSS reporting for other services than E-911, to benefit commercially from A-GNSS information themselves. However, the disclosed method has the ability to continuously estimate 2D position and velocity for UEs, thereby enabling faster and enhanced logged E-911 positioning. This would be particularly useful in cases without A-GNSS availability, like indoors.

The disclosed method can also be used e.g. for personal safety applications, offered by cellular operators, e.g. in avalanche prone terrain. Cellular operators could provide continuous estimation of user kinematics, logging 2D position and velocity independently of the handset capability or availability of A-GNSS, perhaps coupled to additional alarm functionality.

As used herein, the non-limiting terms "User Equipment (UE)", "station (STA)" and "wireless communication device" or "wireless device" may refer to a mobile phone, a cellular phone, a Personal Digital Assistant (PDA) equipped with radio communication capabilities, a smart phone, a laptop or Personal Computer (PC) equipped with an internal or external mobile broadband modem, a tablet PC with radio communication capabilities, a target device, a device to device UE, a machine type UE or UE capable of machine to machine communication, iPAD, Customer Premises Equipment (CPE), Laptop Embedded Equipment (LEE), Laptop Mounted Equipment (LME), Universal Serial Bus (USB) dongle, a portable electronic radio communication device, a sensor device equipped with radio communication capabilities or the like. In particular, the term "UE", the term "Station", the term "wireless device" and the term "wireless communication device" should be interpreted as non-limiting terms comprising any type of wireless device communicating with a network node in a wireless communication system and/or possibly communicating directly with another wireless communication device. In other words, a wireless communication device may be any device equipped with circuitry for wireless communication according to any relevant standard for communication.

As used herein, the non-limiting term "network node" may refer to base stations, access points, network control nodes such as network controllers, radio network controllers, base station controllers, access controllers, and the like. In particular, the term "base station" may encompass different types of radio base stations including standardized base stations such as Node Bs (NB), or evolved Node Bs (eNB) and also macro/micro/pico radio base stations, home base stations, also known as femto base stations, relay nodes, repeaters, radio access points, Base Transceiver Stations (BTS), and even radio control nodes controlling one or more Remote Radio Units (RRU), or the like.

In the following, the general non-limiting term "communication unit" includes network nodes and/or associated wireless devices.

As used herein, the term "network device" may refer to any device located in connection with a communication network, including but not limited to devices in access networks, core networks and similar network structures. The term network device may also encompass cloud-based network devices.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

According to an aspect of the proposed technology there is provided a network node configured to estimate a kinematic state of a UE in a wireless communication system. The network node is configured to estimate a kinematic state comprising two-dimensional position, two-dimensional velocity and a frequency bias of the UE. The estimation is based on and fully enabled by measurements of obtained Doppler shifts, relative two different antennas of the wireless communication system, of radio signals transmitted from the UE, and obtained distance-establishing measurements associated with the UE.

Figure 20:
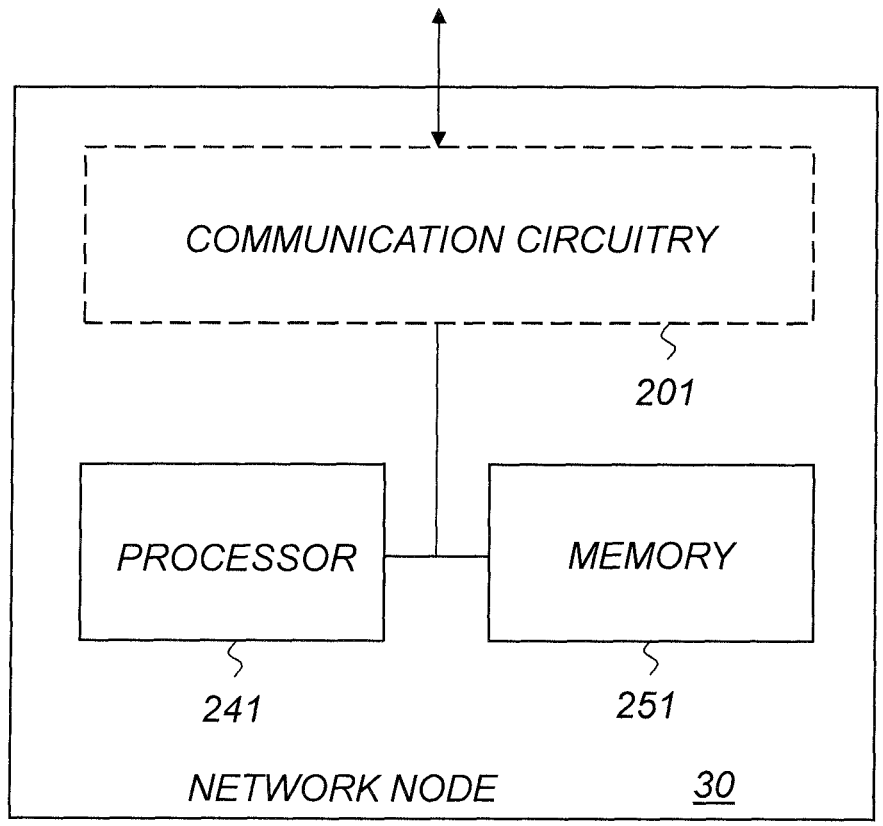
FIG. 20 is a schematic block diagram illustrating an embodiment of a network node.

FIG. 20 is a schematic block diagram illustrating an example of a network node 30, typically a base station, based on a processor-memory implementation according to an embodiment. In this particular example, the network node 30 comprises a processor 241 and a memory 251, the memory comprising instructions executable by the processor 241, whereby the processor 241 is operative to estimate the kinematic state in two dimensions of the UE based on the measurements of obtained Doppler shifts and the obtained distance-establishing measurements.

Optionally, the network node 30 may also include a communication circuitry 201. The communication circuitry 201 may include functions for wired and/or wireless communication with other devices and/or network nodes in the network. In a particular example, the communication circuitry 201 may be based on radio circuitry for communication with one or more other nodes, including transmitting and/or receiving information. The communication circuit 201 may be interconnected to the processor 241 and/or memory 251. By way of example, the communication circuit 201 may include any of the following: a receiver, a transmitter, a transceiver, input/output (I/O) circuitry, input port (s) and/or output port(s). The communication circuit 201 may be operative to obtain the measurements of Doppler shifts and the distance-establishing measurements.

In one embodiment, the distance-establishing measurements are selected among timing advance, path loss and fingerprint positioning, and preferably, the distance-establishing measurements are timing advance measurements.

In one embodiment, the network node is configured to perform the estimating utilizing continuous time models.

In one embodiment, the network node is configured to perform the estimating utilizing two movement models. Both movement models are constant continuous-time constant-velocity models with acceleration noise. The acceleration noise of one of the two movement models is larger than for the other one of the two movement models.

In one embodiment, the measurements of Doppler shifts and the distance-establishing measurements are associated with a respective measurement time. Preferably, the network node is configured to perform the estimating by interacting multiple model filtering using a continuous-by-time mode-switching model.

In one embodiment, the network node is configured to perform the estimation of a kinematic state by utilizing Extended Kalman Filtering.

In one embodiment, the network node is a base station.

Figure 21:
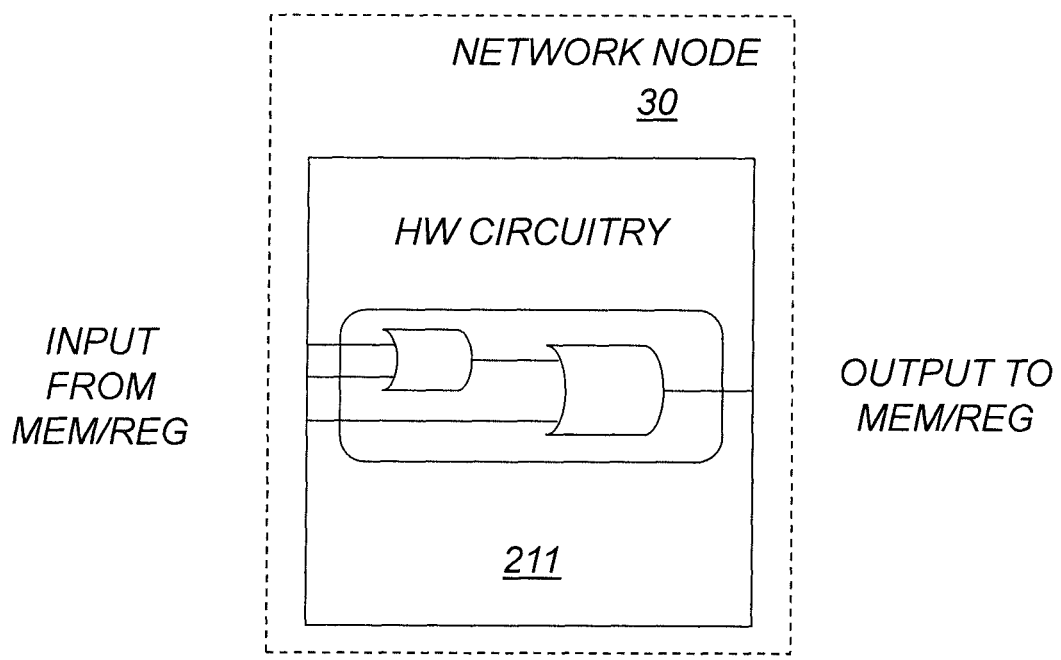
FIG. 21 is a schematic block diagram illustrating an embodiment of a network node based on a hardware circuitry implementation.

FIG. 21 is a schematic block diagram illustrating another example of a network node 30, based on a hardware circuitry implementation according to an embodiment. Particular examples of suitable hardware (HW) circuitry 211 include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG), and/or memory units (MEM).

Figure 22:
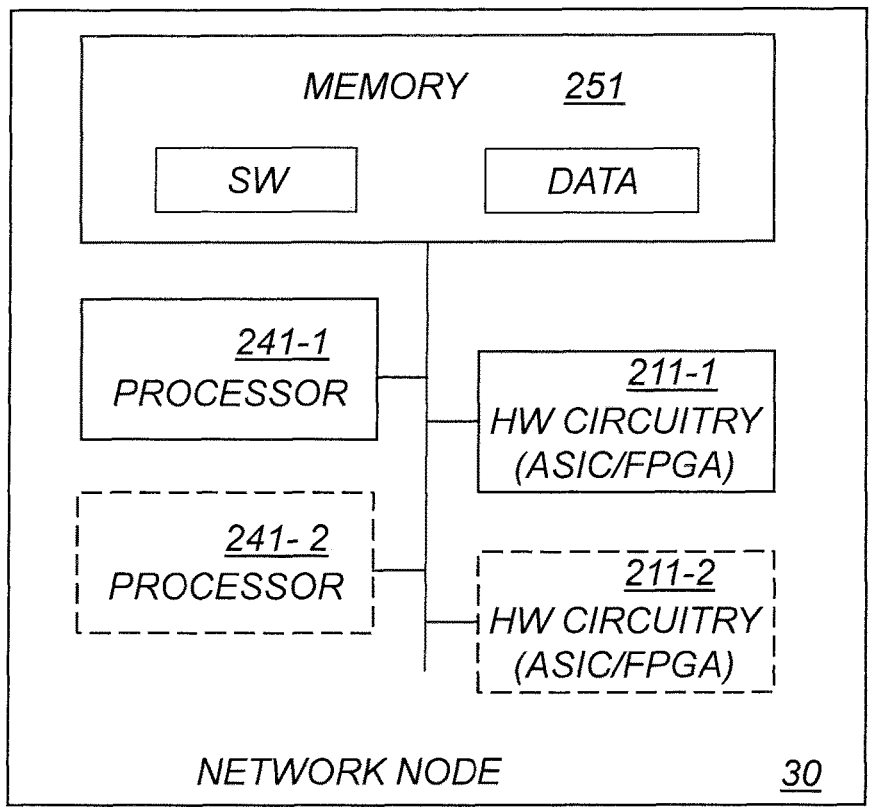
FIG. 22 is a schematic block diagram illustrating another embodiment of a network node based on combination of both processor and hardware circuitry.

FIG. 22 is a schematic block diagram illustrating yet another example of a network node 30, based on combination of both processor(s) 241-1, 241-2 and hardware circuitry 211-1, 211-2 in connection with suitable memory unit(s) 251. The network node 30 comprises one or more processors 241-1, 241-2, memory 251 including storage for software and data, and one or more units of hardware circuitry 211-1, 211-2 such as ASICs and/or FPGAs. The overall functionality is thus partitioned between programmed software (SW) for execution on one or more processors 241-1, 241-2, and one or more pre-configured or possibly reconfigurable hardware circuits 211-1, 211-2 such as ASICs and/or FPGAs. The actual hardware-software partitioning can be decided by a system designer based on a number of factors including processing speed, cost of implementation and other requirements.

Alternatively, or as a complement, at least some of the steps, functions, procedures, modules and/or blocks described herein may be implemented in software such as a computer program for execution by suitable processing circuitry such as one or more processors or processing units.

The flow diagram or diagrams presented herein may therefore be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Figure 23:
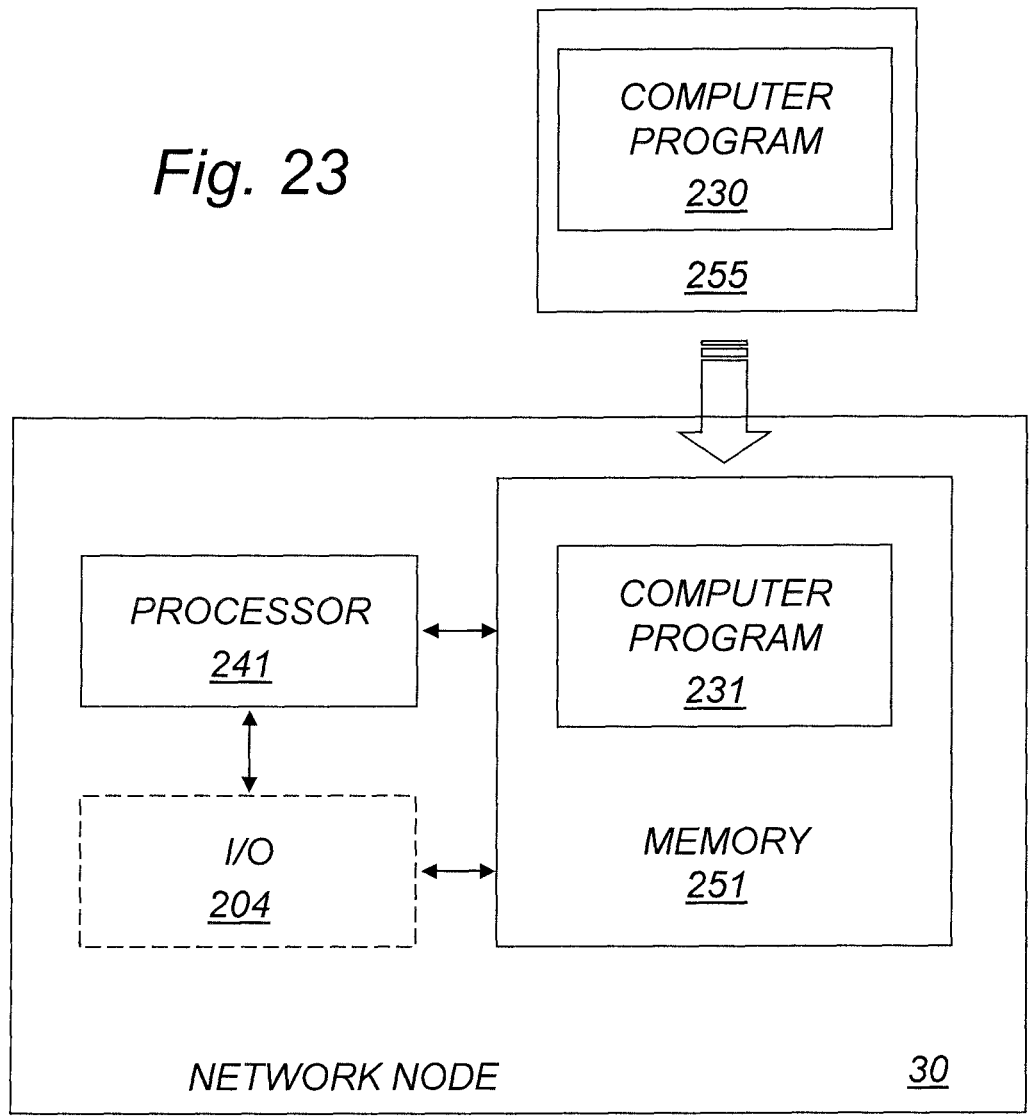
FIG. 23 is a schematic diagram illustrating an embodiment of a computer-implementation of a network node.

FIG. 23 is a schematic diagram illustrating an embodiment of a computer-implementation of a network node 30. In this particular embodiment, at least some of the steps, functions, procedures, modules and/or blocks described herein are implemented in a computer program 231, which is loaded into the memory 251 for execution by processing circuitry including one or more processors 241. The processor(s) 241 and memory 251 are interconnected to each other to enable normal software execution. An optional input/output device 204 may also be interconnected to the processor(s) 241 and/or the memory 251 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors 241 is thus configured to perform, when executing the computer program 231, well-defined processing tasks such as those described herein. The terms "processing circuitry" and "processor" will in the present disclosure be used as synonymous expressions.

The processing circuitry does not have to be dedicated to only execute the above-described steps, functions, procedure and/or blocks, but may also execute other tasks.

In a particular embodiment, the computer program 231 comprises instructions, which when executed by at least one processor 241, cause the processor(s) 241 to estimate a kinematic state of a UE comprising two-dimensional position, two-dimensional velocity and a frequency bias of the UE based on and fully enabled by measurements of obtained Doppler shifts, relative two different antennas of the wireless communication system, of radio signals transmitted from the UE, and obtained distance-establishing measurements associated with the UE.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 230; 231 may be realized as a computer program product, which is normally carried or stored on a computer-readable medium 255; 251, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

Figure 24:
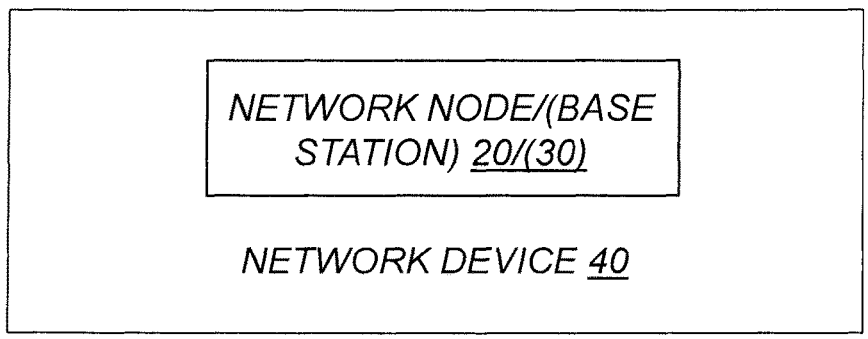
FIG. 24 is a schematic block diagram illustrating an embodiment of a network device.

FIG. 24 is a schematic block diagram illustrating an example of a network device (ND) 40 comprising a network node 30 according to any of the embodiments.

According to an aspect, there is provided a network device 40 comprising a network node 30 as described herein.

The network device may be any suitable network device in the wireless communication system, or a network device in connection with the wireless communication system. By way of example, the network device may be a suitable network node such a base station or an access point. However, the network device may alternatively be a cloud-implemented network device.

According to another aspect, there is provided a communication unit 10 in a wireless communication system, wherein the communication unit 10 comprises a network node 30 as described herein. The communication unit may be any suitable communication unit in the wireless communication system. By way of example, the communication unit may be a wireless communication device such as a UE, STA or similar end-user device.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 25:
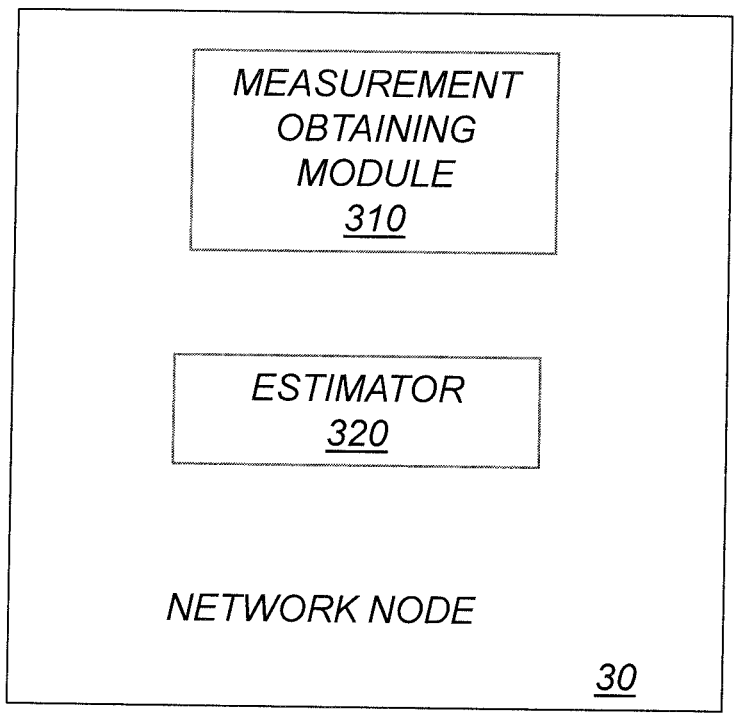
FIG. 25 is a schematic diagram illustrating an embodiment of a network node.

FIG. 25 is a schematic diagram illustrating an example of a network node 30 for kinematic state estimation of a UE in a wireless communication system. The network node 30 comprises an estimator 320 for estimating a kinematic state comprising two-dimensional position, two-dimensional velocity and a frequency bias of a UE. The estimation is based on and fully enabled by obtained measurements of Doppler shifts, relative two different antennas of the wireless communication system, of radio signals transmitted from the UE, and obtained distance-establishing measurements associated with the UE. Preferably, the network node 30 also comprises a measurement obtaining module for obtaining the measurements of Doppler shifts and the distance-establishing measurements.

Alternatively it is possible to realize the module(s) in FIG. 25 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

It is becoming increasingly popular to provide computing services (hardware and/or software) in network devices such as network nodes and/or servers where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

There are different forms of virtualization that can be useful in this context, including one or more of:

Consolidation of network functionality into virtualized software running on customized or generic hardware. This is sometimes referred to as network function virtualization.

Co-location of one or more application stacks, including operating system, running on separate hardware onto a single hardware platform. This is sometimes referred to as system virtualization, or platform virtualization.

Co-location of hardware and/or software resources with the objective of using some advanced domain level scheduling and coordination technique to gain increased system resource utilization. This is sometimes referred to as resource virtualization, or centralized and coordinated resource pooling.

Although it may often desirable to centralize functionality in so-called generic data centers, in other scenarios it may in fact be beneficial to distribute functionality over different parts of the network.

Figure 26:
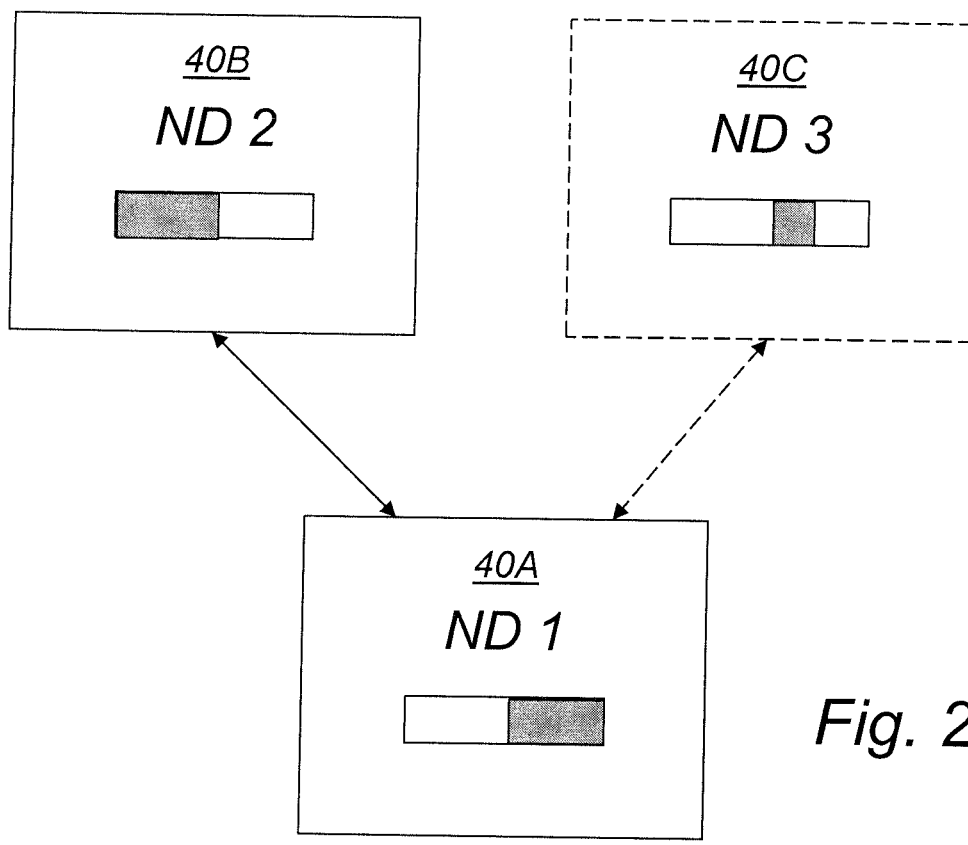
FIG. 26 is a schematic diagram illustrating a general example of functionality distribution or partition.

FIG. 26 is a schematic diagram illustrating an example of how functionality can be distributed or partitioned between different Network Devices (ND) in a general case. In this example, there are at least two individual, but interconnected network devices, ND 1 and ND 2, with reference numerals 40A and 40B, respectively, which may have different functionalities, or parts of the same functionality, partitioned between the network devices 40A and 40B. There may be additional network devices, such as ND 3, with reference numeral 40C, being part of such a distributed implementation. The network devices 40A-C may be part of the same wireless communication system, or one or more of the network devices may be so-called cloud-based network devices located outside of the wireless communication system.

Figure 27:
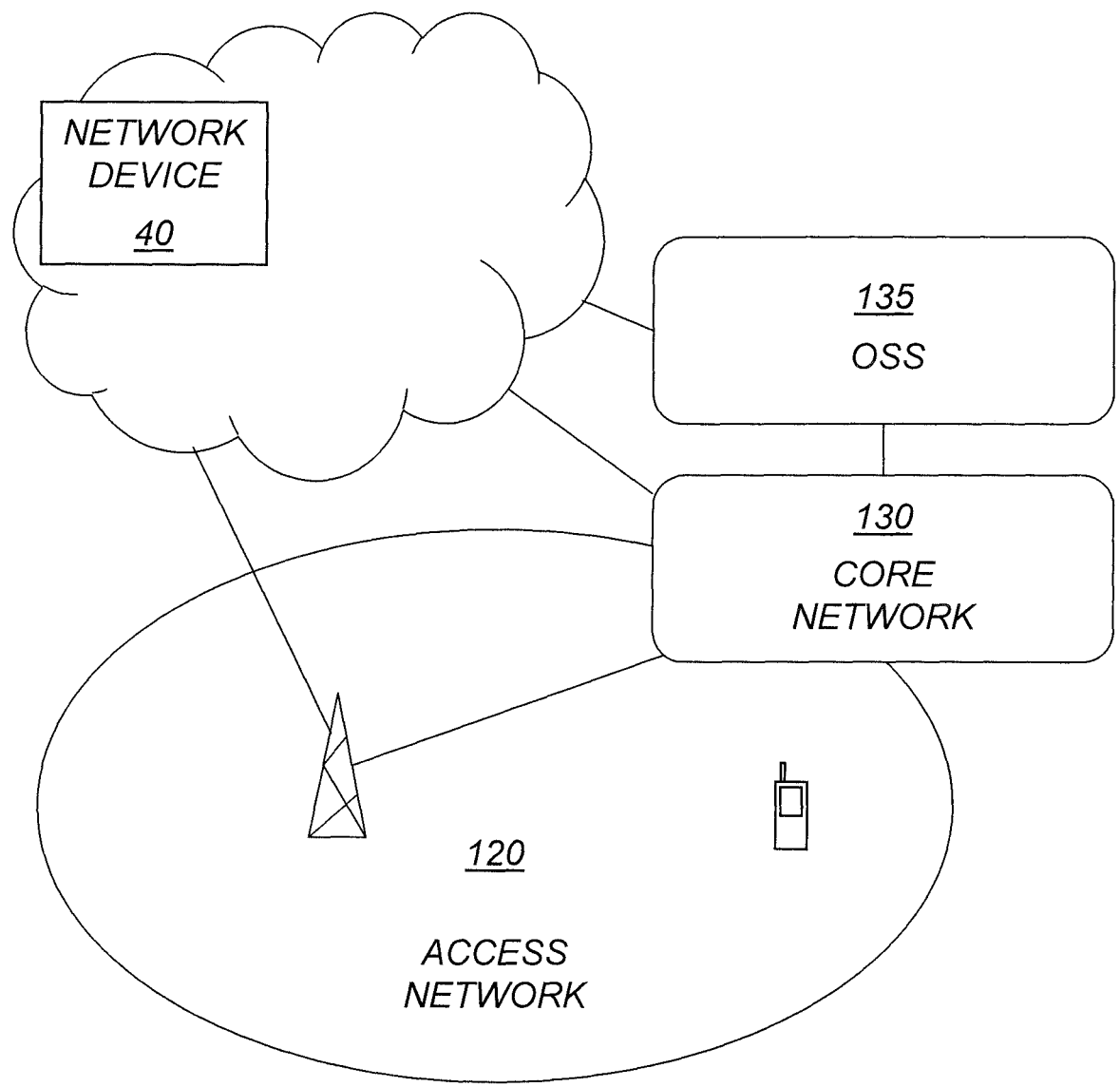
FIG. 27 is a schematic diagram illustrating an example of a wireless communication system in cooperation with one or more cloud-based network devices.

FIG. 27 is a schematic diagram illustrating an example of a wireless communication system, including an access network 120 and/or a core network 130 and/or an Operations and Support System (OSS), 135 in cooperation with one or more cloud-based network devices 40. Functionality relevant for the access network 120 and/or the core network 130 and/or the OSS system 135 may be at least partially implemented for execution in a cloud-based network device 40, with suitable transfer of information between the cloud-based network device and the relevant network nodes and/or communication units in the access network and/or the core network and/or the OSS system.

A Network Device (ND) may generally be seen as an electronic device being communicatively connected to other electronic devices in the network.

By way of example, the network device may be implemented in hardware, software or a combination thereof. For example, the network device may be a special-purpose network device or a general purpose network device, or a hybrid thereof.

A special-purpose network device may use custom processing circuits and a proprietary operating system (OS), for execution of software to provide one or more of the features or functions disclosed herein.

A general-purpose network device may use Common Off-The-Shelf (COTS) processors and a standard OS, for execution of software configured to provide one or more of the features or functions disclosed herein.

By way of example, a special-purpose network device may include hardware comprising processing or computing resource(s), which typically include a set of one or more processors, and physical network interfaces (NIs), which sometimes are called physical ports, as well as non-transitory machine readable storage media having stored thereon software. A physical NI may be seen as hardware in a network device through which a network connection is made, e.g. wirelessly through a Wireless Network Interface Controller (WNIC) or through plugging in a cable to a physical port connected to a Network Interface Controller (NIC). During operation, the software may be executed by the hardware to instantiate a set of one or more software instance(s). Each of the software instance(s), and that part of the hardware that executes that software instance, may form a separate virtual network element.

By way of another example, a general-purpose network device may for example include hardware comprising a set of one or more processor(s), often COTS processors, and network interface controller(s) (NICs), as well as non-transitory machine readable storage media having stored thereon software. During operation, the processor(s) executes the software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system (or a shim executing on a base operating system) that allows for the creation of multiple software containers that may each be used to execute one of a sets of applications. In an example embodiment, each of the software containers (also called virtualization engines, virtual private servers, or jails) is a user space instance (typically a virtual memory space). These user space instances may be separate from each other and separate from the kernel space in which the operating system is executed; the set of applications running in a given user space, unless explicitly allowed, cannot access the memory of the other processes. Another such alternative embodiment implements full virtualization, in which case: 1) the virtualization layer represents a hypervisor (sometimes referred to as a Virtual Machine Monitor (VMM)) or the hypervisor is executed on top of a host operating system; and 2) the software containers each represent a tightly isolated form of software container called a virtual machine that is executed by the hypervisor and may include a guest operating system.

A hypervisor is the software/hardware that is responsible for creating and managing the various virtualized instances and in some cases the actual physical hardware. The hypervisor manages the underlying resources and presents them as virtualized instances. What the hypervisor virtualizes to appear as a single processor may actually comprise multiple separate processors. From the perspective of the operating system, the virtualized instances appear to be actual hardware components.

A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications as well as the virtualization layer and software containers if implemented, are collectively referred to as software instance(s). Each set of applications, corresponding software container if implemented, and that part of the hardware that executes them (be it hardware dedicated to that execution and/or time slices of hardware temporally shared by software containers), forms a separate virtual network element(s).

The virtual network element(s) may perform similar functionality compared to Virtual Network Element(s) (VNEs). This virtualization of the hardware is sometimes referred to as Network Function Virtualization (NFV). Thus, NFV may be used to consolidate many network equipment types onto industry standard high-volume server hardware, physical switches, and physical storage, which could be located in data centers, NDs, and Customer Premise Equipment (CPE). However, different embodiments may implement one or more of the software container(s) differently. For example, while embodiments are illustrated with each software container corresponding to a VNE, alternative embodiments may implement this correspondence or mapping between software container-VNE at a finer granularity level; it should be understood that the techniques described herein with reference to a correspondence of software containers to VNEs also apply to embodiments where such a finer level of granularity is used.

According to yet another embodiment, there is provided a hybrid network device, which includes both custom processing circuitry/proprietary OS and COTS processors/standard OS in a network device, e.g. in a card or circuit board within a ND. In certain embodiments of such a hybrid network device, a platform Virtual Machine (VM), such as a VM that implements functionality of a special-purpose network device, could provide for para-virtualization to the hardware present in the hybrid network device.

The present disclosure presents a new method for very accurate estimation of the complete kinematic UE state. The UE state is defined to be the 2-dimensional (2D) position and the 2D velocity vector. The method is based on a technical breakthrough, in the understanding of how Doppler shift measurements should be used in kinematic state estimation. The disclosed solution uses eNB/gNB uplink measurements on necessary air interface transmissions, in only the minimum number of 2 sites, thereby boosting availability and minimizing complexity. The solution provides 2D kinematic information, directly usable for all features of the eNB/gNB. The solution works irrespective of how the UE is designed or set up, in that no special UE hardware or software pre-requisites exist. The UE cannot disable the exploited air interface measurements of e.g. RTT and Doppler shift. The solution allows deployment in any generation base station, including 3G, 4G, 5G and xG (x>5). The solution provides excellent accuracy and availability with availability better than 90% in most regions, including indoors, giving 2D position inaccuracy better than 15 meters (1-sigma) and 2D velocity inaccuracy better than 1.5 meters/second (1-sigma).

The preferred embodiments disclose a number of novel algorithmic details, including a new continuous-time based mode switching algorithm, allowing accurate processing of irregularly sampled data. Preferably, a new dual 2D movement model is used, where each mode has a joint state for estimation of a UE frequency shift quantity.

The preferred method makes use of precisely one RTT measurement and one Doppler shift measurement measured in an eNB/gNB in a first site, together with only one additional Doppler shift measurement measured in a second site.

The preferred method discloses a new IMM state estimation method that uses available RTT and Doppler shift measurements in an eNB/gNB, together with Doppler shift measurements from only one more eNB/gNB at another site.

The method can hence be implemented only in the eNB/gNB and it is not depended on the UE in any way, since the TA measurement parts performed in the UE is needed to set up and maintain communication and since the Doppler shift measurements are performed in the base station uplink receiver on necessary air interface transmissions from the UE. In addition, the method does not rely on any satellite signal information and hence indoor availability is much better than A-GNSS.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

APPENDIX A

Kinematic State Estimation
Dynamic Movement Models

As will be clear below, one of the first things that is needed when a kinematic UE state estimator is designed is a model for the movement of the UE. That model may be quantified in very many ways. However, the model typically expresses the major movement characteristics of the UE. This model is then embedded into the state estimation algorithm, representing parts of the available prior information. In kinematic aircraft state estimation systems such model has been defined in terms of differential equation or difference equation models of the aircraft trajectories. Examples include 3D straight line/constant velocity models, in combination with models for turns, where such turn models comprise dominating acceleration prior information. This means that the movement may be divided into stages, were each stage is characterized by one of a few movement modes. Hence it is relevant to review prior art multiple mode estimation methods.

Multiple Mode Estimation

There are quite a few known methods for estimation where multiple dynamic modes describe the behavior of an object, whose state is estimated. Some of the most important ones are the Bayesian inference methods, the particle filter, ad hoc methods and the interacting multiple model filter.

Bayesian Inference

A first and most general way of performing UE state estimation would be to depend on the joint probability distribution of the objects state. The propagation of this state forward in time is known in prior art to be governed by the so-called Fokker-Planck partial differential equation. The measurement processing is performed by a multi-dimensional integration, to obtain the posterior probability state distribution from the likelihood of the measurement and the prior probability distribution. This process is known under the name Bayesian inference. It is, however, immensely more computationally complex and memory intensive than the solution disclosed here.

Particle Filtering

Bayesian inference is today often approximated or replaced by so-called particle filters, in which the probability density functions of the estimation problem are discretized in terms of individual "particles". This set of particles represents a kind of sampling. Depending on the algorithm, a nonlinear dynamic model may be estimated by partly handling the dynamics and update of each particle state individually. Depending on the fit to the measured data, resampling is then performed by re-distribution, removal or addition of particles, repeatedly. This way, the particle filter is able to perform estimation of multiple mode systems since the nonlinear dynamics of each particle can be strongly dependent on its state. Since also particle filtering is much more computationally intense than other possible solution, this choice is not the preferred choice, and the details are therefore not discussed further here. However, it should be noted that particle filtering may be used within the concept of the present ideas.

Ad Hoc Methods

At the other complexity extreme, each mode may be modeled separately and also estimated separately. Then, ad hoc logic may be used to select the movement mode. Traditional air vehicle state estimation was designed in that way. One movement mode was assumed to be constant velocity movement, i.e. straight-line movement, and the other movement mode was a maneuver mode, modeled by a leaky constant velocity movement that responded to measurements with much higher agility than the constant velocity mode. Finally, an ad hoc maneuver detector was used to choose the maneuver filter in case that was deemed to match measurements better. After the maneuver was terminated a re-initialized constant velocity movement mode was used for state estimation, to achieve good noise suppression. This approach was robust but suffered, for example, from difficulties in the selection of threshold values for the maneuver detector, as well as from associated inaccuracy problems. It is noticed that, even if such ad hoc filtering methods are the preferred solution within the present ideas, they may be used therein.

IMM Filtering

As should now be clear, state estimation is a well investigated field of research. However, solving general state estimation problems formulated in terms of nonlinear stochastic differential equations and nonlinear measurement models is still a challenge. This is due to the very high computational complexity associated with the high order Fokker-Planck equation and the Bayesian state updates. This "curse of dimensionality" has resulted in the development of approximate methods, ranging from still very computationally intense particle filtering methods, to linearization approaches combined with Kalman filtering. The latter algorithms belong to the class of extended Kalman filters (EKFs) and they form components of the preferred solution of the present ideas.

As should also be clear from the above discussion, there are less computationally intense estimation methods available, when it can be assumed that the estimated system is operating in a finite number of dynamic modes, and switches between these. In such cases, multiple models may be coupled by an underlying Markov model. One of the best algorithms in terms of performance and computational complexity for this class of systems is the interacting multiple model (IMM) filtering algorithm, invented in the 1980's.

In the IMM approach, the state estimate of the system is computed by parallel propagation and update of r interacting filters, with each filter using a different combination of the state estimates of the interacting filters at the previous update time as initial values. The mixing of state estimates is thus performed in the beginning of the update cycle.

Figure 1:
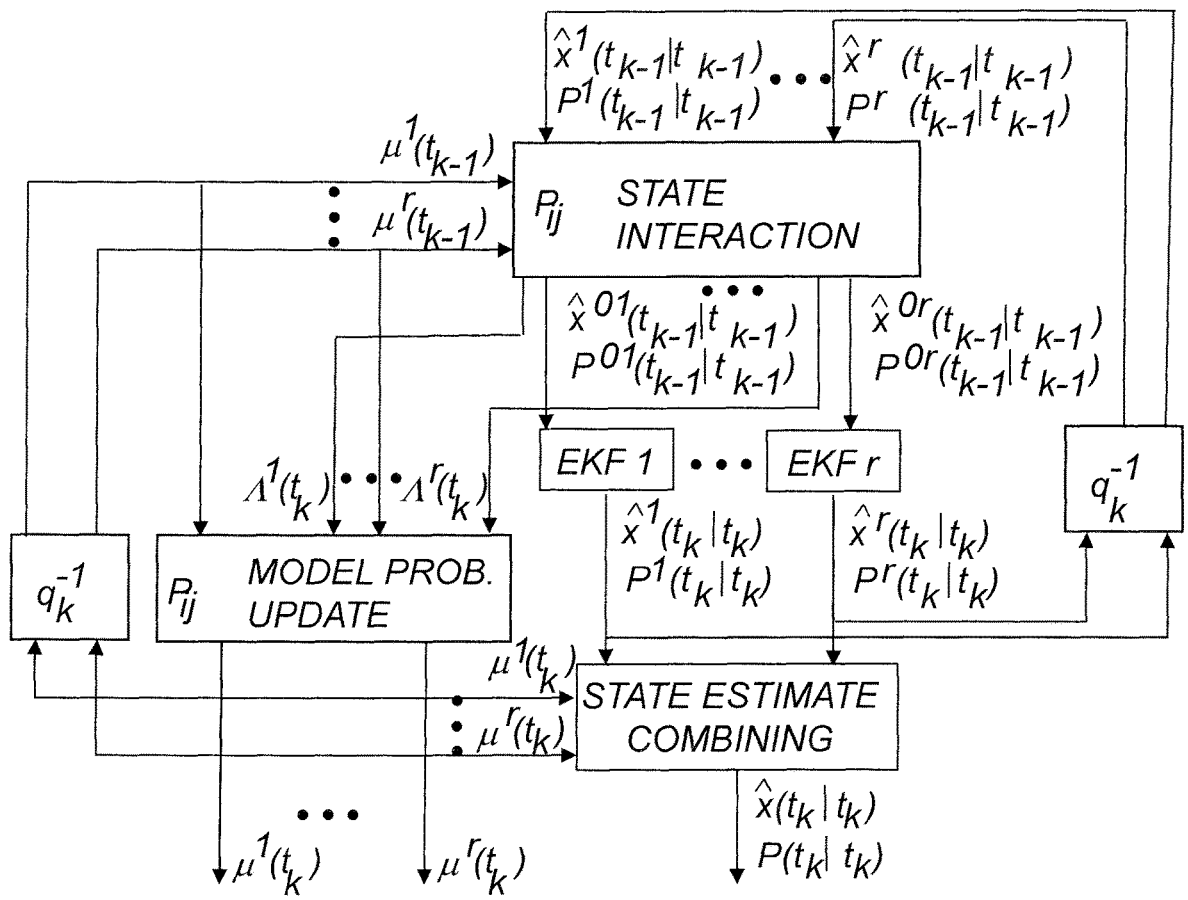
FIG. 1 illustrates the structure of the interacting multiple model filtering algorithm.

FIG. 1 describes one cycle of the IMM algorithm. $q_k^{-1}(s(t_k))=s(t_{k-1})$, for all signals s. The nomenclature is summarized by Table A1.

TABLE A1

Nomenclature of the IMM filter of FIG. 1.

| Symbol | Interpretation |
|---|---|
| $\hat{x}^i(t_k\|t_k)$ | State estimate at time $t_k$, for mode i, i = 1, . . . , r. |
| $P^i(t_k\|t_k)$ | State covariance matrix at time $t_k$, for mode i, i = 1, . . . , r. |
| $\mu_i(t_k)$ | Mode probability at time $t_k$, for mode i, i = 1, . . . , r. |
| $P_{ij}$ | Mode transition probability matrix |
| $\Lambda^i(t_k)$ | Likelihood function at time $t_k$, for mode i, i = 1, . . . , r. |
| $\hat{x}(t_k\|t_k)$ | State estimate at time $t_k$. |
| $P(t_k\|t_k)$ | State covariance matrix at time $t_k$. |

The steps of one cycle of the IMM filter are the following.
State Interaction and State Mixing To provide initial conditions to the mode matched filtering, the state and covariance matrices of the previous iteration need to be mixed. This mixing is based on the mode transition probability matrix and the mode probabilities of the previous iteration, and is given by the so called mixing probabilities, $\mu_{i|j}$, i,j=1, . . . r. The definition is given by the probability that mode $M_i$ was in effect at time $t_{k-1}$, given that mode $M_j$ is in effect at time $t_k$, conditioned on the data $Z^{k-1}$ up to time $t_{k-1}$. The final result becomes:

$$\mu_{i|j}(t_{k-1} \mid t_{k-1}) = \frac{1}{\bar{c}^j} p_{ij}\mu_i(t_{k-1}) \quad (A1)$$

$$\bar{c}^j = \sum_{i=1}^{r} p_{ij}\mu_i(t_{k-1}) \quad (A2)$$

Given the mixing probabilities, states and covariance matrices can be mixed according to the formulas:

$$\hat{x}^{0j}(t_{k-1}|t_{k-1})=\Sigma_{i=1}^{r}(t_{k-1}|t_{k-1})\hat{x}^i(t_{k-1}|t_{k-1}), j=1, \ldots, r, \quad (A3)$$

$$P^{0j}(t_{k-1}|t_{k-1})=\Sigma_{i=1}^{r}(t_{k-1}|t_{k-1})(P^i(t_{k-1}|t_{k-1})+(\hat{x}^i(t_{k-1}|t_{k-1})-\hat{x}^{0j}(t_{k-1}|t_{k-1}))(\hat{x}^i(t_{k-1}|t_{k-1})-\hat{x}^{0j}(t_{k-1}|t_{k-1}))^T). \quad (A4)$$

Note the additional term that appears when summing up covariance matrices of a Gaussian mixture.
Mode Matched Filtering Given the initial conditions, one iteration of the EKFs of each mode is performed. The EKF iteration is described below.
Mode Probability Update The mode probability update requires the likelihood of the latest measurement conditioned on the mode and the initial state and covariance matrices. The likelihood is a Gaussian given in general form by:

$$\Lambda^j(t_k)=p(z(t_k)|M_j,\hat{x}^{0j}(t_{k-1}|t_{k-1}),P^{0j}(t_{k-1}|t_{k-1})), j=1, \ldots, r, \quad (A5)$$

Given the likelihood, the mode probabilities then follow as:

$$\mu^j(t_k) = \frac{1}{c}\Lambda^j(t_k)\bar{c}^j, \quad (A6)$$

$$c = \sum_{j=1}^{r}\Lambda^j(t_k)\bar{c}^j. \quad (A7)$$

State Estimate Combining

Finally, the updated mode probabilities can be used to combine the mode state estimates and covariance matrix to one resulting state estimate and covariance matrix as:

$$\hat{x}(t_k|t_k)=\Sigma_{j=1}^{r}\mu^j(t_k)\hat{x}^j(t_k|t_k), \quad (A8)$$

$$P(t_k|t_k)=\Sigma_{j=1}^{r}\mu^j(t_k)(P^j(t_k|t_k)+(\hat{x}^j(t_k|t_k)-\hat{x}(t_k|t_k))(\hat{x}^j(t_k|t_k)-\hat{x}(t_k|t_k))^T) \quad (A9)$$

The extended Kalman Filter Each mode is modeled as a linear state space differential equation and a nonlinear measurement equation. The differential equation is then discretized as described below. Since the measurement update requires a linearized measurement matrix in case the Kalman filter is used as a basis for the EKF, it follows that the linearization needed is a linearization of the measurement equation, around the predicted measurement:

$$\hat{z}^i(t_k|t_{k-1})=h(\hat{x}^i(t_k|t_{k-1})), i=1, \ldots, r. \quad (A10)$$

The underlying state space model of the EKF is:

$$\hat{x}^i(t_{k+1})=A^i(t_{k+1},t_k)\hat{x}^i(t_k)+w^i(t_k) \quad (A11)$$

$$\hat{z}^i(t_k)=h(\hat{x}^i(t_k))+e(t_k), i=1, \ldots, r. \quad (A12)$$

where the symbols are defined in Table A2. The quantities $w^i(t_k)$ and $e(t_k)$ are the systems and measurement noises, respectively. Their covariance matrices are:

$$Q^i(t_{k+1},t_k)=E[w^i(t_k)(w^i(t_k))^T], i=1, \ldots, r. \quad (A13)$$

$$R^i(t_{k+1},t_k)=E[e(t_k)(e(t_k))^T], i=1, \ldots, r. \quad (A14)$$

TABLE A2

System and EKF nomenclature.

| Symbol | Interpretation |
|---|---|
| $A^i$ | Discrete time systems matrix, for mode i = 1, . . . , r. |
| $Q^i$ | Systems noise covariance matrix, for mode i = 1, . . . , r. |
| $R^i$ | Measurement noise covariance matrix, for mode i = 1, . . . , r. |
| h(x) | Measurement equation |
| $K^i$ | Kalman gain matrix |

This results in the EKF iteration (i=1, . . . , r):

$$\hat{x}^i(t_k \mid t_{k-1}) = A^i(t_k, t_{k-1})\hat{x}^i(t_{k-1} \mid t_{k-1}) \quad (A15)$$

$$P^i(t_k \mid t_{k-1}) = A^i(t_k, t_{k-1})P^i(t_{k-1} \mid t_{k-1})\left(A^i(t_k, t_{k-1})\right)^T + Q^i(t_k, t_{k-1})$$

$$\hat{z}^i(t_k \mid t_{k-1}) = h\left(\hat{x}^i(t_k \mid t_{k-1})\right)$$

$$H^i\left(\hat{x}^i(t_k \mid t_{k-1})\right) = \left.\frac{\partial h(\hat{x})}{\partial \hat{x}}\right|_{x=\hat{x}^i(t_k|t_{k-1})}$$

$$\varepsilon^i(t_k) = z(t_k) - \hat{z}^i(t_k \mid t_{k-1})$$

$$S^i(t_k) = H^i\left(\hat{x}^i(t_k \mid t_{k-1})\right)P^i(t_k \mid t_{k-1})\left(H^i\left(\hat{x}^i(t_k \mid t_{k-1})\right)\right)^T + R^i(t_k, t_{k-1})$$

-continued $$K^i(t_k) = P^i(t_k \mid t_{k-1})\left(H^i(\hat{x}^i(t_k \mid t_{k-1}))\right)^T \left(S^i(t_k)\right)^{-1}$$

$$\hat{x}^i(t_k \mid t_k) = \hat{x}^i(t_k \mid t_{k-1}) + K^i \varepsilon^j(t_k)$$

$$P^i(t_k \mid t_k) = P^i(t_k \mid t_{k-1}) - K^i(t_k) S^i(t_k) \left(K^i(t_k)\right)^T]$$

An EKF Complexity Reduction

In the present disclosure, the general assumption is that measurements may be taken and reported at any time. This leads to the use of irregularly sampled continuous time state space models, and associated algorithms. This has a distinct complexity advantage, in that the inversion of $S^i(t_k)$ of the EKF computations is modified to a simple division. This can be used even if synchronous measurements are received, by doing the update step one after the other, with none or very little state and covariance propagation between measurement times.

Measurements

Round Trip Time Measurements

Figure 2:
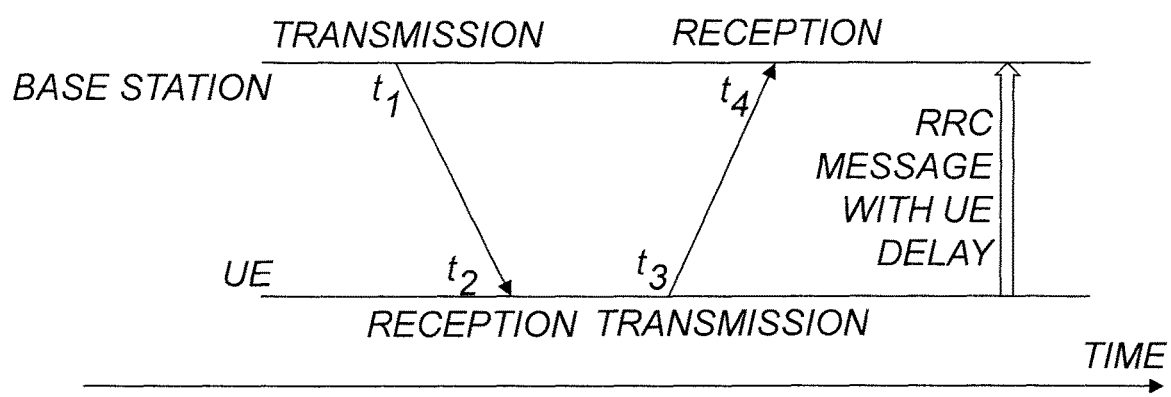
FIG. 2 illustrates the principle of a round-trip-time measurement.

One way to measure range is to measure the travel time of radio waves from a base station to a UE and back, i.e. a round-trip-time (RTT) measurement. Given the round-trip time measurement, the range follows as:

$$R = c\frac{RTT}{2}, \qquad (A16)$$

where c denotes the speed of light. The principle of the RTT measurement is illustrated in FIG. 2. The RTT value is thus obtained as:

$$RTT = t_4 - t_1 - UE\,RxTx, \qquad (A17)$$

where UE RxTx is measured in the UE as:

$$UERxTx = t_3 - t_2 \qquad (A18)$$

and reported back to the base station over the radio resource protocol (RRC).

Doppler Shift Measurement

Doppler shift measurements are, or can be made, available in the wireless systems, in each eNB/gNB. Briefly, the Doppler frequency is related to the speed by which a user approaches a radio source as:

$$f_D = \frac{v}{c} f_c, \qquad (A19)$$

where $f_D$ is the Doppler frequency, v is the (departing) velocity of the UE with respect to the base station, c is the speed of light and $f_c$ is the carrier frequency.

The Doppler measurement can be obtained in several ways. One approach is to use the Fourier transformations that is done when Orthogonal Frequency-Division Multiplexing (OFDM) reception is performed in 4G and 5G cellular systems. The Fourier transform pair:

$$e^{iw_0 t} f(t) \leftrightarrow F(j(w-w_0)) \qquad (A20)$$

can then be exploited in the uplink to compare the phase shift between pilot signals on say two OFDM symbols after each other. This also allows for multi-base station Doppler measurement.

In Long-Term Evolution (LTE) the Physical Uplink Control CHannel (PUCCH) channel needs to be used for this purpose, while in New Radio (NR) the PUCCH channel and sounding reference signals (SRSs) may be used, since in NR up to 4 adjacent symbols may be scheduled as SRS. Dedicated averaging over time can also be a part of the measurement process.

ABBREVIATIONS

2D Two-dimensional
4G Fourth Generation
5G Fifth Generation
A-GNSS Assisted Global Navigation Satellite Systems
ASIC Application Specific Integrated Circuits
BTS Base Transceiver Stations
CD Compact Disc
COTS Common Off-The-Shelf
CPE Customer Premises Equipment
CPU Central Processing Units
DSP Digital Signal Processors
DVD Digital Versatile Disc
EKF Extended Kalman filter
eNB evolved Node B
FPGA Field Programmable Gate Arrays
gNB New radio NodeB
HDD Hard Disk Drive
HW hardware
IMM Interacting Multiple Model
I/O input/output
LEE Laptop Embedded Equipment
LME Laptop Mounted Equipment
LTE Long-Term Evolution
MEM memory units
mmse minimum mean-square error
NB Node B
ND Network Device
NFV Network Function Virtualization
NI Network Interfaces
NIC Network Interface Controller
NR New Radio
ODE Ordinary Differential Equation
OFDM Orthogonal Frequency-Division Multiplexing
OS Operating System
OSS Operations and Support System
OTDOA Observed Time Difference Of Arrival
PC Personal Computer
PDA Personal Digital Assistant
PLC Programmable Logic Controllers
PUCCH Physical Uplink Control Channel
RAM Random Access Memory
REG registers
ROM Read-Only Memory
RRU Remote Radio Units
RTT Round-Trip-Time
SRS Sounding Reference Signals
STA Station
SW software
TA Timing Advance
UE User Equipment
USB Universal Serial Bus
U-TDOA uplink time difference of arrival
VM Virtual Machine
VMM Virtual Machine Monitor
VNE Virtual Network Element
WNIC Wireless Network Interface Controller

REFERENCES

[1] A. Kangas, I. Siomina and T. Wigren, "Positioning in LTE"—in S. A. Zekavat and R. M. Buehrer (eds.), Handbook of Position Location: Theory, Practice and Advances, 2:nd Ed., February, 2019, pp. 1207-1216.

[2] Y. Bar-Shalom and X. R. Li, Estimation and Tracking—Principles, Techniques and Software. pp. 262-263, 461-470. Norwood, MA: Artech House, 1993.

The invention claimed is:

1. A method in a network node for kinematic state estimation of a user equipment in a wireless communication system, the method comprising:
   obtaining, from each of two different antennas of the wireless communication system, measurements of Doppler shifts;
   obtaining distance-establishing measurements associated with the user equipment; and
   estimating a kinematic state comprising two-dimensional position, two-dimensional velocity and a frequency bias of said user equipment based on and fully enabled by the obtained measurements of Doppler shifts, relative the two different antennas of the wireless communication system, of radio signals transmitted from the user equipment, and the obtained distance-establishing measurements associated with the user equipment.

2. The method according to claim 1, comprising:
   obtaining the measurements of Doppler shifts; and
   obtaining the distance-establishing measurements.

3. The method according to claim 1, wherein the distance-establishing measurements are selected among timing advance, path loss and fingerprint positioning.

4. The method according to claim 3, wherein the distance-establishing measurements are timing advance measurements.

5. The method according to claim 1, characterized in that said estimating is performed utilizing continuous time models.

6. The method according to claim 1, wherein the estimating is performed utilizing two movement models, both movement models are constant continuous-time constant-velocity models with acceleration noise, where the acceleration noise of one of the two movement models is larger than for the other one of the two movement models.

7. The method according to claim 1, wherein the measurements of Doppler shifts and the distance-establishing measurements are associated with a respective measurement time, whereby for each measurement, the movements models are propagated to said respective measurement time.

8. The method according to claim 7, wherein the estimating is performed by interacting multiple model filtering using a continuous-time mode-switching model.

9. The method according to claim 1, wherein estimating a kinematic state comprises Extended Kalman Filtering.

10. A network node configured to estimate a kinematic state of a user equipment in a wireless communication system, the network node comprising at least one processor configured to:
    obtain, from each of two different antennas of the wireless communication system, measurements of Doppler shifts;
    obtain distance-establishing measurements associated with the user equipment; and
    estimate a kinematic state comprising two-dimensional position, two-dimensional velocity and a frequency bias of the user equipment based on and fully enabled by measurements of the obtained Doppler shifts, relative the two different antennas of the wireless communication system, of radio signals transmitted from the user equipment, and the obtained distance-establishing measurements associated with the user equipment.

11. The network node according to claim 10, wherein the network node comprises a processor and a memory, the memory comprising instructions executable by the processor, whereby the processor is operative to estimate a kinematic state in two dimensions of the user equipment based on the measurements of obtained Doppler shifts and the obtained distance-establishing measurements.

12. The network node according to claim 11, wherein the network node further comprises communication circuitry configured to obtain the measurements of Doppler shifts and the distance-establishing measurements.

13. The network node according to claim 10, wherein the distance-establishing measurements are selected among timing advance, path loss and fingerprint positioning.

14. The network node according to claim 13, wherein the distance-establishing measurements are timing advance measurements.

15. The network node according to claim 10, wherein the network node is configured to perform the estimating utilizing continuous time models.

16. The network node according to claim 10, wherein the network node is configured to perform the estimating utilizing two movement models, both movement models are constant continuous-time constant-velocity models with acceleration noise, where the acceleration noise of one of the two movement models is larger than for the other one of the two movement models.

17. The network node according to claim 10, wherein the measurements of Doppler shifts and the distance-establishing measurements are associated with a respective measurement time.

18. The network node according to claim 17, wherein the network node is configured to perform the estimating by interacting multiple model filtering using a continuous-time mode-switching model.

19. The network node according to claim 10, wherein the network node is configured to perform the estimating of a kinematic state by utilizing Extended Kalman Filtering.

20. The network node according to claim 10, wherein the network node is a base station.

21. A non-transitory computer storage medium storing a computer program comprising instructions, which when executed by at least one processor, cause the at least one processor to:
    obtain, from each of two different antennas of the wireless communication system, measurements of Doppler shifts;
    obtain distance-establishing measurements associated with the user equipment; and
    estimate a kinematic state comprising two-dimensional position, two-dimensional velocity and a frequency bias of a user equipment based on and fully enabled by measurements of the obtained Doppler shifts, relative the two different antennas of a wireless communication system, of radio signals transmitted from the user equipment, and the obtained distance-establishing measurements associated with the user equipment.

* * * * *